United States Patent
Hatano et al.

(10) Patent No.: US 11,169,537 B2
(45) Date of Patent: Nov. 9, 2021

(54) PROVIDING DRIVING SUPPORT IN RESPONSE TO CHANGES IN DRIVING ENVIRONMENT

(71) Applicant: HONDA MOTOR CO., LTD., Tokyo (JP)

(72) Inventors: Kunimichi Hatano, Wako (JP); Masahiko Asakura, Wako (JP); Naoto Sen, Wako (JP); Masaaki Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 348 days.

(21) Appl. No.: 16/092,452

(22) PCT Filed: Apr. 15, 2016

(86) PCT No.: PCT/JP2016/062162
§ 371 (c)(1),
(2) Date: Oct. 10, 2018

(87) PCT Pub. No.: WO2017/179209
PCT Pub. Date: Oct. 19, 2017

(65) Prior Publication Data
US 2019/0163202 A1  May 30, 2019

(51) Int. Cl.
*G05D 1/02* (2020.01)
*B60W 30/00* (2006.01)
(Continued)

(52) U.S. Cl.
CPC ........... *G05D 1/0276* (2013.01); *B60W 30/00* (2013.01); *G05D 1/0246* (2013.01);
(Continued)

(58) Field of Classification Search
CPC ............... G05D 1/0276; G05D 1/0246; G05D 2201/0213; G06K 9/00798; H04W 4/46;
(Continued)

(56) References Cited

U.S. PATENT DOCUMENTS 6,037,860 A * 3/2000 Zander .................. G01S 13/931
340/436
8,179,281 B2 * 5/2012 Strauss .................. G08G 1/163
340/903
(Continued)

FOREIGN PATENT DOCUMENTS

CN 101389521 3/2009
CN 101542553 9/2009
(Continued)

OTHER PUBLICATIONS

International Search Report and Written Opinion for International Application No. PCT/JP2016/062162 dated Jul. 19, 2016, 10 pgs.
(Continued)

*Primary Examiner* — Richard A Goldman
(74) *Attorney, Agent, or Firm* — Amin, Turocy & Watson, LLP

(57) ABSTRACT

A subject vehicle includes: a communication device communicating with an external device; a detection unit detecting a state of the surroundings of a subject vehicle; a driving support control unit executing driving support of automatically executing at least a part of speed control or steering control of the subject vehicle on the basis of the state of the surroundings of the subject vehicle detected by the detection unit; an extraction unit extracting environment information causing a change in control in the driving support from information of the state of the surroundings of the subject vehicle detected by the detection unit; and a communication control unit transmitting the environment information
(Continued)

extracted by the extraction unit to an external device using the communication unit.

40 Claims, 14 Drawing Sheets

(51) Int. Cl.
    *G08G 1/09*            (2006.01)
    *G06K 9/00*            (2006.01)
    *H04W 4/46*           (2018.01)

(52) U.S. Cl.
    CPC ........... *G06K 9/00798* (2013.01); *G08G 1/09* (2013.01); *G05D 2201/0213* (2013.01); *H04W 4/46* (2018.02)

(58) Field of Classification Search
    CPC ...... G08G 1/09; G08G 1/0104; G08G 1/0108; G08G 1/0112; G08G 1/012; G08G 1/0125; B60W 60/00; B60W 60/001; B60W 60/0011; B60W 30/00; B60W 30/09; B60W 30/10; B60W 30/14; B60W 30/143; B60W 30/0956; B60W 30/095; B60W 2256/45; B60W 2256/50; B60W 2256/55; B60W 2256/60; B60W 2256/65
    USPC ............................................ 701/24, 23, 117
    See application file for complete search history.

(56) References Cited

U.S. PATENT DOCUMENTS

| | | | | |
|---|---|---|---|---|
| 8,706,393 | B2* | 4/2014 | Miller | B60W 30/09 701/301 |
| 9,336,436 | B1* | 5/2016 | Dowdall | G06K 9/00362 |
| 10,640,121 | B2* | 5/2020 | Brew | B60W 30/10 |
| 10,788,585 | B2* | 9/2020 | Ushani | G01S 7/4817 |
| 10,807,592 | B2* | 10/2020 | Golov | B60W 30/09 |
| 2010/0030474 | A1* | 2/2010 | Sawada | B62D 15/0265 701/301 |
| 2011/0098898 | A1* | 4/2011 | Stahlin | G08G 1/095 701/70 |
| 2011/0178710 | A1* | 7/2011 | Pilutti | B60W 30/08 701/301 |
| 2013/0060401 | A1* | 3/2013 | Hahne | B60W 30/09 701/2 |
| 2013/0151058 | A1* | 6/2013 | Zagorski | B60W 30/0956 701/23 |
| 2014/0149013 | A1* | 5/2014 | Matsuno | B60T 7/12 701/70 |
| 2015/0081188 | A1* | 3/2015 | Kornhaas | B60W 30/0956 701/70 |
| 2015/0211868 | A1 | 7/2015 | Matsushita et al. | |
| 2015/0266473 | A1* | 9/2015 | Hayasaka | G08G 1/166 701/70 |
| 2016/0133131 | A1* | 5/2016 | Grimm | G08G 1/096725 701/117 |
| 2016/0159350 | A1* | 6/2016 | Pilutti | B60W 30/143 701/23 |
| 2016/0185345 | A1* | 6/2016 | Sasabuchi | B60W 30/08 701/301 |
| 2016/0358477 | A1* | 12/2016 | Ansari | G06Q 30/0251 |
| 2017/0039855 | A1* | 2/2017 | Maeda | B60W 30/09 |
| 2017/0101095 | A1* | 4/2017 | Nilsson | B60W 30/146 |
| 2017/0151982 | A1* | 6/2017 | Fujii | G06K 9/6267 |
| 2017/0234689 | A1* | 8/2017 | Gibson | G05D 1/0061 701/25 |
| 2017/0329331 | A1* | 11/2017 | Gao | B60W 50/0098 |
| 2017/0336629 | A1* | 11/2017 | Suzuki | G05D 1/0088 |
| 2018/0015918 | A1* | 1/2018 | Bae | B60W 30/09 |
| 2018/0025643 | A1* | 1/2018 | Yamamoto | B60W 30/09 701/23 |
| 2018/0079422 | A1* | 3/2018 | Weinstein-Raun | G05D 1/0289 |
| 2018/0113459 | A1* | 4/2018 | Bennie | G05D 1/028 |
| 2018/0201260 | A1* | 7/2018 | Ichikawa | G01S 17/58 |
| 2018/0237011 | A1* | 8/2018 | Laurent | B60W 30/162 |
| 2018/0273030 | A1* | 9/2018 | Weldon | G01S 17/931 |
| 2018/0341257 | A1* | 11/2018 | Nordbruch | B60T 7/12 |
| 2018/0370527 | A1* | 12/2018 | Rachor | B60Q 9/008 |
| 2019/0031186 | A1* | 1/2019 | Hardee | G05D 1/0088 |
| 2019/0035279 | A1* | 1/2019 | Tang | B60W 30/09 |
| 2019/0118801 | A1* | 4/2019 | Noh | G06K 9/00805 |
| 2019/0143968 | A1* | 5/2019 | Song | B60R 11/04 701/301 |
| 2019/0168754 | A1* | 6/2019 | Makled | B60W 30/143 |
| 2019/0325736 | A1* | 10/2019 | Zhang | G06K 9/00818 |
| 2019/0382003 | A1* | 12/2019 | Jiang | B60W 50/14 |
| 2019/0382004 | A1* | 12/2019 | Golov | B60W 60/001 |
| 2020/0005631 | A1* | 1/2020 | Visintainer | G06K 9/2018 |

FOREIGN PATENT DOCUMENTS

| | | |
|---|---|---|
| CN | 102667888 | 9/2012 |
| CN | 103847735 | 6/2014 |
| CN | 104670228 | 6/2015 |
| CN | 104837705 | 8/2015 |
| CN | 105015545 | 11/2015 |
| CN | 105015547 | 11/2015 |
| EP | 2617617 | 7/2013 |
| JP | 09-161196 | 6/1997 |
| JP | 2001-010519 | 1/2001 |
| JP | 2008-170404 | 7/2008 |
| JP | 2015-141051 | 8/2015 |
| JP | 2015-175825 | 10/2015 |
| JP | 2016-045856 | 4/2016 |
| WO | 2014-013985 | 1/2014 |
| WO | 2016-052507 | 4/2016 |

OTHER PUBLICATIONS

Chinese Office Action for Chinese Patent Application No. 201680084444.5 dated Oct. 21, 2020.

* cited by examiner

332

| STATE | PLACE | DETECTION DATE AND TIME | NUMBER OF TIMES OF RECEPTION |
|---|---|---|---|
| EI-1 | (X1,Y1) | y1/m1/d1 h1:mi1 | N |
| EI-2 | (X2,Y2) | y2/m2/d2 h2:mi2 | K |

PROVIDING DRIVING SUPPORT IN RESPONSE TO CHANGES IN DRIVING ENVIRONMENT

TECHNICAL FIELD

Embodiments of the present invention relate to a vehicle control system, a vehicle control method, and a vehicle control program.

BACKGROUND ART

In recent years, technologies for automatically controlling at least one of acceleration/deceleration and steering of a subject vehicle such that the subject vehicle runs along a route to a destination have been researched (for example, see Patent Literature 1). In relation with this, conventionally, technologies for detecting running partition lines such as white lines on a road by performing image processing of an image acquired from an in-vehicle camera, which images a running route, and causing a vehicle to run along the running partition lines are known (for example, see Patent Literature 2).

CITATION LIST

Patent Literature

[Patent Literature 1]
Japanese Unexamined Patent Application, First Publication No. H9-161196
[Patent Literature 2]
Japanese Unexamined Patent Application, First Publication No. 2001-10519

SUMMARY OF INVENTION

Technical Problem

However, for example, in a case in which information required for driving support cannot be acquired from surroundings like in a case in which a running partition line in which a subject vehicle is running cannot be recognized due to blurring or the like, there are cases in which it is necessary to take a countermeasure such as ending the driving support or lowering the degree of driving support or automatic driving.

The present invention is in view of such situations, and one object thereof is to provide a vehicle control system, a vehicle control method, and a vehicle control program capable of executing driving support responding to changes in running environments.

Solution to Problem

An invention described in claim 1 is a vehicle control system (100) including: a communication unit (55) communicating with an external device; a detection unit (DD) detecting a state of the surroundings of a subject vehicle; a driving support control unit (120) executing driving support of automatically executing at least a part of speed control or steering control of the subject vehicle on the basis of the state of the surroundings of the subject vehicle detected by the detection unit; an extraction unit (135) extracting environment information causing a change in control in the driving support from information of the state of the surroundings of the subject vehicle detected by the detection unit; and a communication control unit (190) transmitting the environment information extracted by the extraction unit to an external device using the communication unit.

As an invention described in claims 2, in the vehicle control system according to claim 1, the communication control unit requests the environment information relating to a road on which the subject vehicle is running from the external device using the communication unit, and the driving support control unit changes a control plan of the driving support on the basis of the environment information that is received in response to the request using the communication unit and is received by the communication unit.

As an invention described in claims 3, in the vehicle control system according to claim 2, the external device receives the environment information from a plurality of vehicles, the communication unit receives the environment information and the number of times the environment information has been updated from the external device, and the driving support control unit executes the driving support on the basis of the environment information in a case in which the number of times the environment information has been updated received by the communication unit is equal to or greater than a threshold and executes the driving support on the basis of information of the surroundings of the subject vehicle without using the environment information in a case in which the number of times the environment information has been updated received by the communication unit is less than the threshold.

As an invention described in claims 4, in the vehicle control system according to claim 2, the communication unit receives the environment information and a detection time of the environment information from the external device, and the driving support control unit executes the driving support on the basis of the environment information in a case in which an elapsed time from the detection time of the environment information received by the communication unit is less than a threshold and executes the driving support on the basis of information on the surroundings of the subject vehicle without using the environment information in a case in which the elapsed time from the detection time of the environment information received by the communication unit is equal to or greater than the threshold.

As an invention described in claims 5, in the vehicle control system according to claim 1, a malfunction detecting unit detecting a malfunction of the detection unit is further included, and the extraction unit excludes information detected by the detection unit of which a malfunction has been detected from the environment information in a case in which the malfunction of the detection unit is detected by the malfunction detecting unit.

As an invention described in claims 6, in the vehicle control system according to claim 1, the extraction unit counts the number of times the environment information has been extracted, and the driving support control unit executes the driving support on the basis of the environment information in a case in which the number of times the environment information has been extracted counted by the extraction unit is equal to or greater than a threshold and executes the driving support on the basis of information on the surroundings of the subject vehicle without using the environment information in a case in which the number of times the environment information has been extracted counted by the extraction unit is less than the threshold.

As an invention described in claims 7, in the vehicle control system according to claim 1, the driving support control unit executes the driving support on the basis of the environment information in a case in which an elapsed time from the detection time of the environment information is less than a threshold and executes the driving support on the basis of information on the surrounds of the subject vehicle without using the environment information in a case in which the elapsed time from the detection time of the environment information is equal to or greater than the threshold.

As an invention described in claims 8, in the vehicle control system according to claim 1, the external device is mounted in another vehicle, and the communication control unit transmits the environment information to a following vehicle running behind the subject vehicle on a road on which the subject vehicle is running.

As an invention described in claims 9, in the vehicle control system according to claim 1, the communication control unit receives the environment information from a preceding vehicle running ahead of the subject vehicle, and the driving support control unit executes the driving support on the basis of the environment information received from the preceding vehicle.

As an invention described in claims 10, in the vehicle control system according to claim 1, the detection unit includes an imaging unit imaging a road in the vicinity of the subject vehicle, the driving support control unit executes the driving support on the basis of presence/absence of a road partition line based on an image captured by the imaging unit, and the extraction unit determines a state of the road partition line on the basis of the image captured by the imaging unit and extracts the state of the road partition line as the environment information.

As an invention described in claims 11, in the vehicle control system according to claim 1, the detection unit detects brightness of light introduced from outside of the subject vehicle, the driving support control unit executes the driving support on the basis of the brightness of the light detected by the detection unit, and the extraction unit extracts information of the brightness of the light as the environment information.

As an invention described in claims 12, in the vehicle control system according to claim 1, the driving support control unit sets a first threshold for an elapsed time from the detection time of the environment information relating to a road on which the subject vehicle is running to be larger than a second threshold for an elapsed time from the detection time of the environment information relating to the brightness of the light introduced from outside of the subject vehicle.

An invention according to claim 13 is a vehicle control method using an in-vehicle computer. The vehicle control method includes: executing driving support of automatically executing at least a part of speed control or steering control of a subject vehicle on the basis of a state of the surroundings of the subject vehicle detected by a detection unit that detects the state of the surroundings of the subject vehicle; extracting environment information causing a change in control in the driving support from information of the state of the surroundings of the subject vehicle detected by the detection unit; and transmitting the extracted environment information to an external device.

An invention according to claim 14 is a program causing an in-vehicle computer to execute: performing driving support of automatically executing at least a part of speed control or steering control of a subject vehicle on the basis of a state of the surroundings of the subject vehicle detected by a detection unit that detects the state of the surroundings of the subject vehicle; extracting environment information causing a change in control in the driving support from information of the state of the surroundings of the subject vehicle detected by the detection unit; and transmitting the extracted environment information to an external device.

Advantageous Effects of Invention

According to the inventions described in claims 1, 13, and 14, the environment information acquired by extracting environment information causing a change in control in the driving support from information of the state of the surroundings of the subject vehicle is transmitted to an external device, and accordingly, driving support responding to a change in the driving environment can be executed.

According to the invention described in claim 2, the environment information is requested from an external device, and a control plan of the driving support is changed on the basis of the environment information that is received in response to the request, and accordingly, automated driving responding to a change in the driving environment can be executed.

According to the inventions described in claims 3, 4, 6, 7, and 12, the environment information used for executing the driving support can be selected, and accordingly, driving support can be executed using the environment information having high reliability.

According to the invention described in claim 5, since information detected by the detection unit of which a malfunction has been detected is excluded from the environment information, information relating to environments can be transmitted to an external device, and it is possible to suppress information not relating to a change in the environment from being transmitted to an external device.

According to the inventions described in claims 8 and 9, the environment information is transmitted to a following vehicle running behind the subject vehicle, and accordingly, driving support responding to a change in the running environment can be executed for the following vehicle.

According to the invention described in claim 10, a state of a road partition line is extracted as the environment information, and accordingly, driving support responding to a change in the road partition line can be executed.

According to the invention described in claim 11, brightness of light is extracted as the environment information, and accordingly, driving support responding to a change in the brightness of the light introduced to the subject vehicle can be executed.

DESCRIPTION OF EMBODIMENTS

Hereinafter, a vehicle control system, a vehicle control method, and a vehicle control program according to embodiments of the present invention will be described with reference to the drawings.
<Common Configuration>

Figure 1:
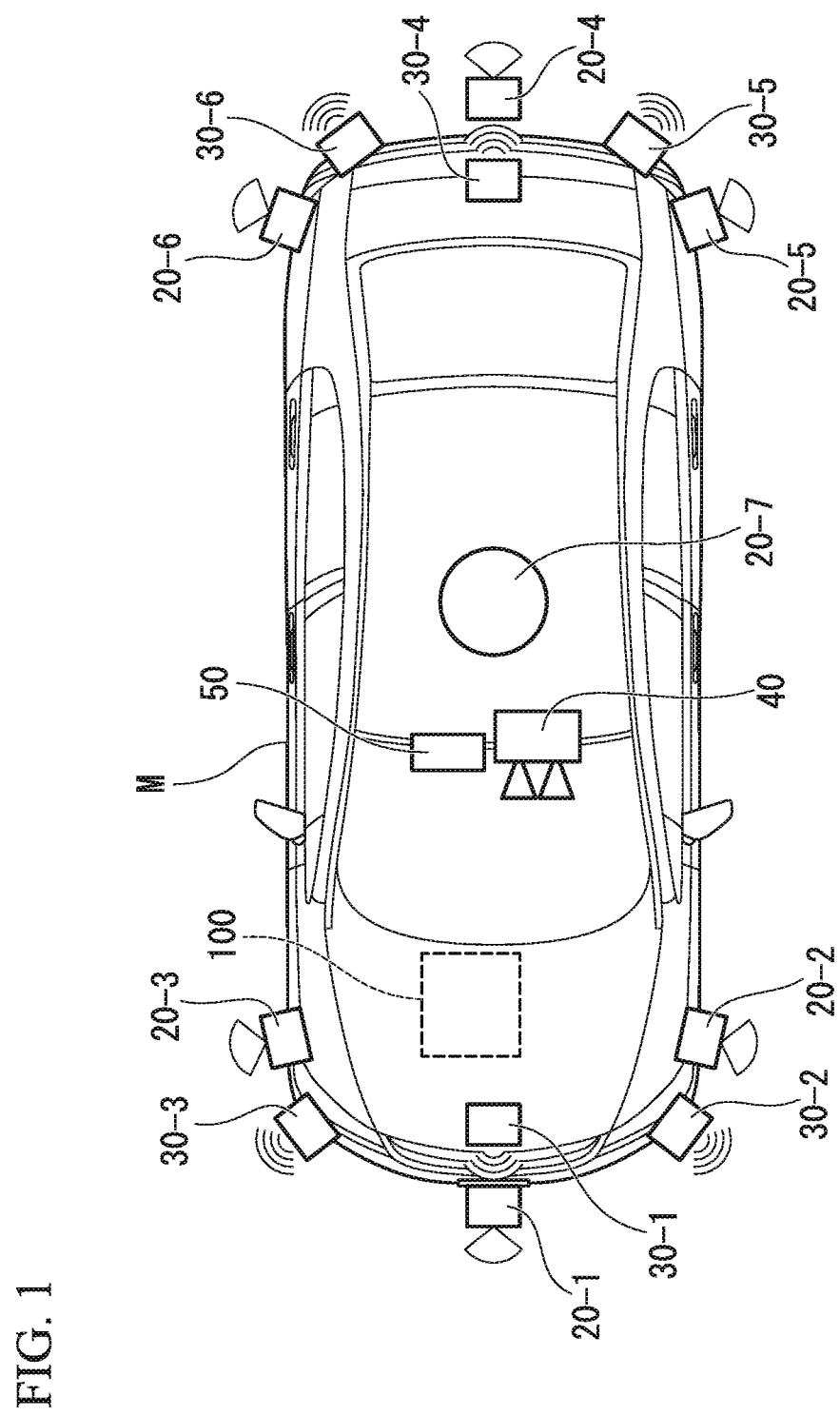
FIG. 1 is a diagram illustrating constituent elements of a subject vehicle M.

FIG. 1 is a diagram illustrating constituent elements of a vehicle in which a vehicle control system 100 according to each embodiment is mounted (hereinafter referred to as a subject vehicle M). A vehicle in which the vehicle control system 100 is mounted, for example, is a vehicle with two wheels, three wheels, four wheels, or the like and includes an automobile having an internal combustion engine such as a diesel engine or a gasoline engine as its power source, an electric vehicle having a motor as its power source, a hybrid vehicle equipped with both an internal combustion engine and a motor, and the like. The electric vehicle described above, for example, is driven using electric power discharged by a cell such as a secondary cell, a hydrogen fuel cell, a metal fuel cell, an alcohol fuel cell, or the like.

As illustrated in FIG. 1, sensors such as finders 20-1 to 20-7, radars 30-1 to 30-6, a camera 40, and the like, a navigation device 50, and a vehicle control system 100 are mounted in the subject vehicle M.

Each of the finders 20-1 to 20-7 is a light detection and ranging or a laser imaging detection and ranging (LIDAR) device measuring a distance to a target by measuring scattered light from emitted light. For example, the finder 20-1 is mounted on a front grille or the like, and the finders 20-2 and 20-3 are mounted on side faces of a vehicle body, door mirrors, inside head lights, near side lamps, or the like. The finder 20-4 is mounted in a trunk lid or the like, and the finders 20-5 and 20-6 are mounted on side faces of the vehicle body, inside tail lamps or the like. Each of the finders 20-1 to 20-6 described above, for example, has a detection area of about 150 degrees with respect to a horizontal direction. In addition, the finder 20-7 is mounted on a roof or the like. For example, the finder 20-7 has a detection area of 360 degrees with respect to a horizontal direction.

The radars 30-1 and 30-4, for example, are long-distance millimeter wave radars having a wider detection area in a depth direction than that of the other radars. In addition, the radars 30-2, 30-3, 30-5, and 30-6 are middle-distance millimeter wave radars having a narrower detection area in a depth direction than that of the radars 30-1 and 30-4.

Hereinafter, in a case in which the finders 20-1 to 20-7 are not particularly distinguished from each other, one thereof will be simply referred to as a "finder 20," and in a case in which the radars 30-1 to 30-6 are not particularly distinguished from each other, one thereof will be simply referred to as a "radar 30." The radar 30, for example, detects an object using a frequency modulated continuous wave (FM-CW) system.

The camera 40, for example, is a digital camera using a solid-state imaging device such as a charge coupled device (CCD), a complementary metal oxide semiconductor (CMOS), or the like. The camera 40 is mounted in an upper part of a front windshield, a rear face of an interior mirror, or the like. The camera 40, for example, repeats imaging of the area in front of the subject vehicle M periodically. The camera 40 may be a stereo camera including a plurality of cameras.

The configuration illustrated in FIG. 1 is merely one example, and a part of the configuration may be omitted, and other different components may be added.

First Embodiment

Figures 2, 3:
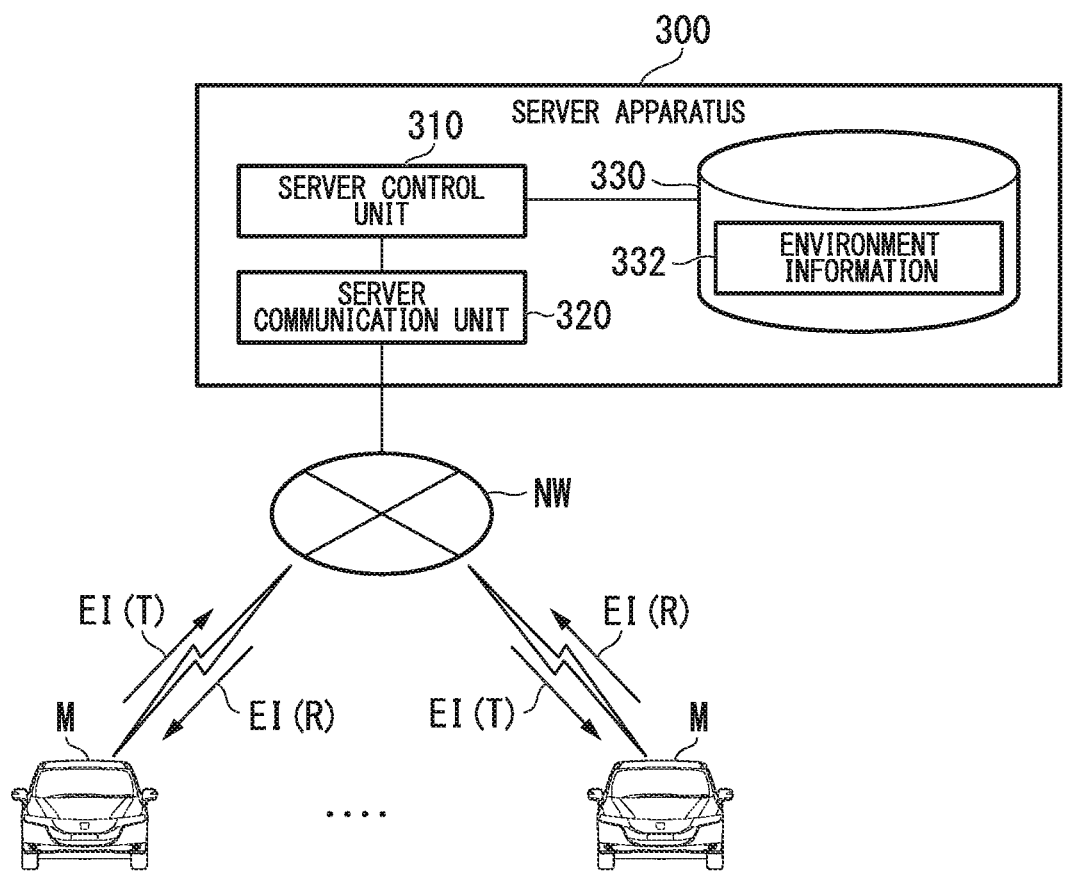
FIG. 2 is a diagram illustrating one example of a relation between a server apparatus 300 and a subject vehicle M according to a first embodiment.
FIG. 3 is a diagram illustrating one example of environment information 332 according to the first embodiment.

FIG. 2 is a diagram illustrating one example of a relation between a server apparatus 300 and a subject vehicle M according to a first embodiment. The server apparatus 300 is one example of an external device for a vehicle control system 100. The server apparatus 300 transmits/receives environment information to/from vehicle control systems 100 of a plurality of subject vehicles M through a network NW. The network NW, for example, includes a radio base station, communication lines, the Internet, and the like. The environment information includes information representing a state of the surroundings of a subject vehicle M that is detected by a detection device such as the finder 20, the radar 30, the camera 40, or the like of the subject vehicle M.

The server apparatus 300, for example, includes a server control unit 310, a server communication unit 320, and a server storage unit 330.

The server control unit 310 is realized by executing a program using a processor such as a central processing unit (CPU). In a case in which environment information IE(T) is received from the vehicle control system 100 mounted in each of the plurality of subject vehicles M, the server control unit 310 stores the received environment information in the server storage unit 330. In addition, in a case in which a request for environment information is received from the vehicle control system 100, the server control unit 310 reads the environment information 332 in response to the request and transmits the read environment information EI(R) to the vehicle control system 100 as a reply.

The server communication unit 320 is a communication interface circuit that executes a communication process. In a case in which the environment information EI(T) transmitted from the vehicle control system 100 is received, the server communication unit 320 supplies the environment information to the server control unit 310. In addition, in a case in which a request for environment information is received from the vehicle control system 100, the server communication unit 320 supplies the request to the server control unit 310. In a case in which environment information 332 in response to the request is supplied from the server control unit 310, the server communication unit 320 transmits the environment information 332 to the vehicle control system 100 as environment information EI(R).

The server storage unit 330 is realized by a read only memory (ROM), a random access memory (RAM), a hard disk drive (HDD), a flash memory, or the like. The server storage unit 330 stores the environment information 332. A program executed by a processor may be stored in the server storage unit 330 in advance. FIG. 3 is a diagram illustrating one example of the environment information 332 according to the first embodiment. In the environment information 332, a place, a detection date and time, and the number of receptions are associated with the state of the surroundings of each subject vehicle M. In addition, a place, a detection date and time, and the number of receptions may be associated with the environment information 332 and the state of the surroundings of the subject vehicle M but are not limited thereto. Thus, only a place may be associated with the state of the surroundings of the subject vehicle M, and only one of a detection date and time and the number of receptions may be associated with the state of the surroundings of the subject vehicle M and a place.

Figure 4:
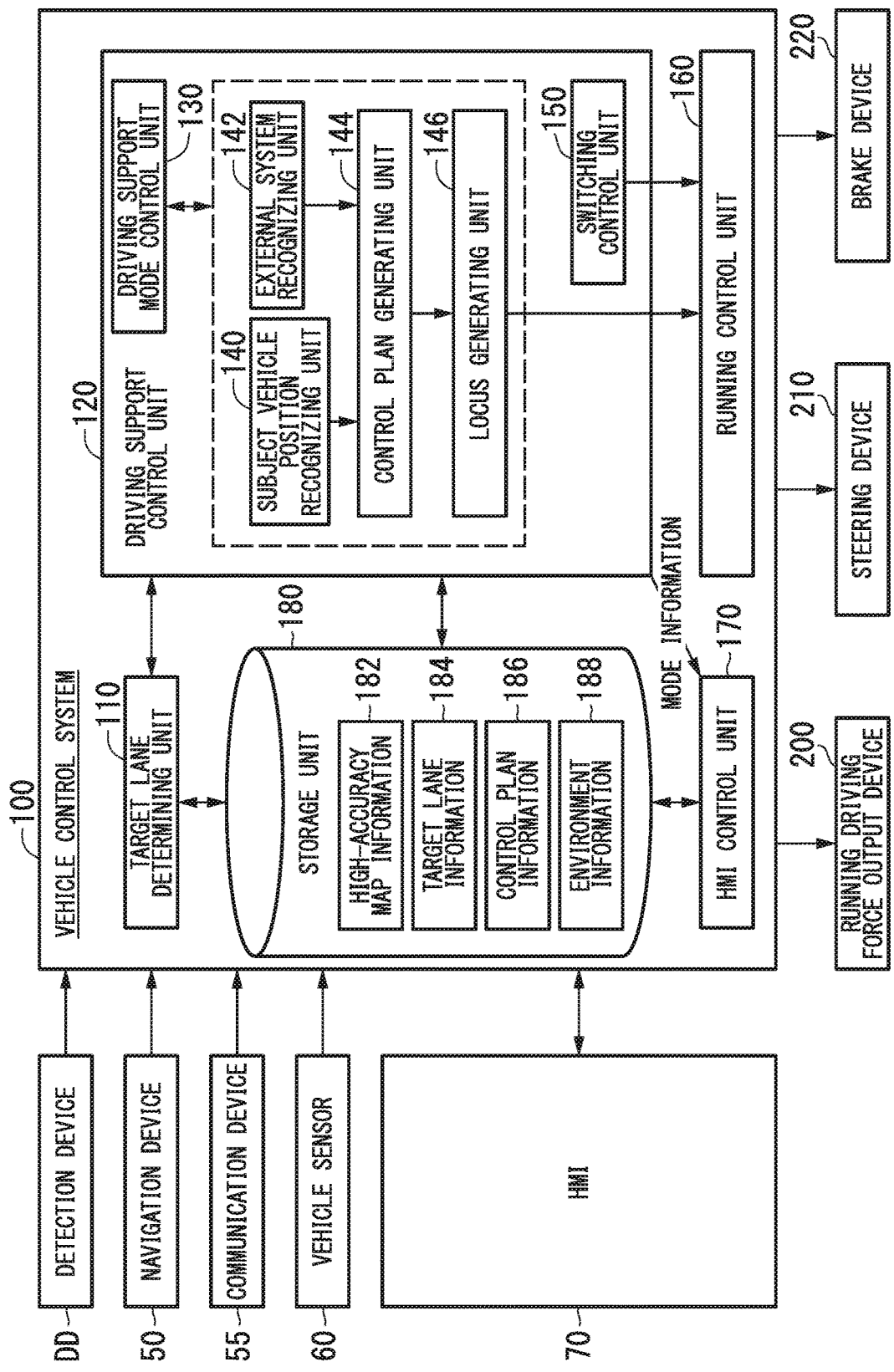
FIG. 4 is a functional configuration diagram focusing on the vehicle control system 100 and is a functional configuration diagram of a subject vehicle M.

FIG. 4 is functional configuration diagram focusing on a vehicle control system 100 according to a first embodiment. In the subject vehicle M, a detection device DD including finders 20, radars 30, a camera 40, and the like, a navigation device 50, a communication device 55, a vehicle sensor 60, a human machine interface (HMI) 70, a vehicle control system 100, a running driving force output device 200, a steering device 210, and a brake device 220 are mounted. Such devices and units are interconnected through a multiple-communication line such as a controller area network (CAN) communication line, a serial communication line, a radio communication network, or the like. A vehicle control system described in the claims may represent not only the "vehicle control system 100" but may include components other than the vehicle control system 100 (the detection unit DD, the HMI 70, and the like).

The navigation device 50 includes a global navigation satellite system (GNSS) receiver, map information (navigation map), a touch-panel-type display device functioning as a user interface, a speaker, a microphone, and the like. The navigation device 50 identifies a location of the subject vehicle M using the GNSS receiver and derives a route from the location to a destination designated by a user. The route derived by the navigation device 50 is provided to the target lane determining unit 110 of the vehicle control system 100. The location of the subject vehicle M may be identified or complemented by an inertial navigation system (INS) using an output of the vehicle sensor 60. In addition, when the vehicle control system 100 executes a manual driving mode, the navigation device 50 performs guidance using speech or a navigation display for a route to the destination. Components used for identifying the location of the subject vehicle M may be disposed to be independent from the navigation device 50. In addition, the navigation device 50, for example, may be realized by a function of a terminal device such as a smartphone, a tablet terminal, or the like held by a user. In such a case, information is transmitted and received using wireless or wired communication between the terminal device and the vehicle control system 100.

The communication device 55 is a communication interface circuit that performs communication with the server apparatus 300 through the network NW. The communication device 55, for example, performs radio communication using a cellular network, a Wi-Fi network, Bluetooth (registered trademark), a dedicated short range communication (DSRC), or the like.

The vehicle sensor 60 includes a vehicle speed sensor detecting a vehicle speed, an acceleration sensor detecting an acceleration, a yaw rate sensor detecting an angular velocity around a vertical axis, an azimuth sensor detecting the azimuth of the subject vehicle M, and the like.

Figure 5:
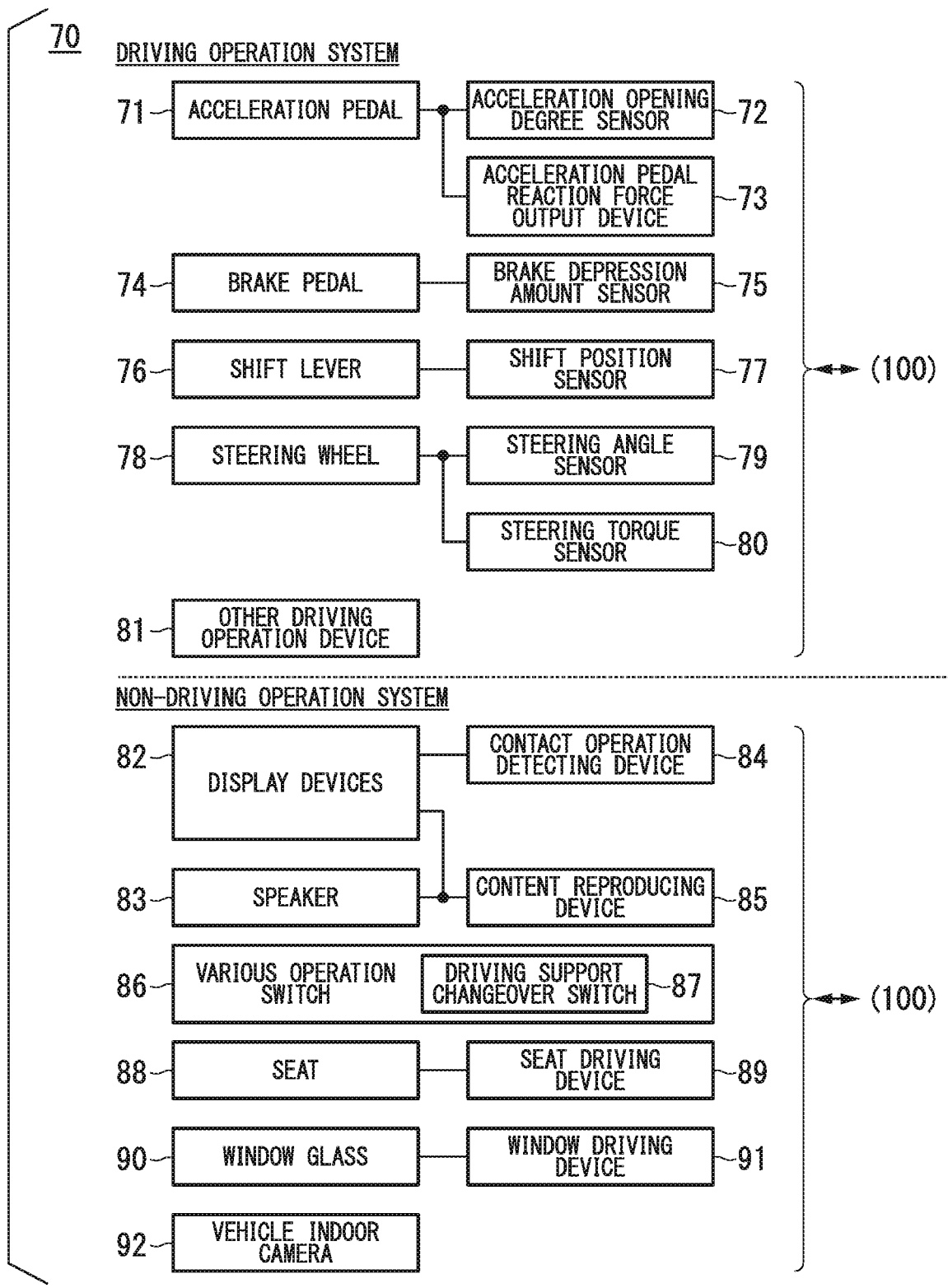
FIG. 5 is a configuration diagram of an HMI 70.

FIG. 5 is a configuration diagram of the HMI 70. The HMI 70, for example, includes a configuration of a driving operation system and a configuration of a non-driving operation system. A boundary therebetween is not clear, and a configuration of a driving operation system may have a function of a non-driving operation system (or vice versa).

For the configuration of the driving operation system, the HMI 70, for example, includes an acceleration pedal 71, an acceleration opening degree sensor 72, an acceleration pedal reaction force output device 73, a brake pedal 74, a brake depression amount sensor (or a master pressure sensor or the like) 75, a shift lever 76, a shift position sensor 77, a steering wheel 78, a steering angle sensor 79, a steering torque sensor 80, and other driving operation devices 81.

The acceleration pedal 71 is an operator that is used for receiving an acceleration instruction (or a deceleration instruction using a returning operation) from a vehicle occupant. The acceleration opening degree sensor 72 detects a depression amount of the acceleration pedal 71 and outputs an acceleration opening degree signal representing the depression amount to the vehicle control system 100. In addition, instead of outputting the acceleration opening degree signal to the vehicle control system 100, the acceleration opening degree signal may be directly output to the running driving force output device 200, the steering device 210, or the brake device 220. This similarly applies to the configuration of the other driving operation system to be described below. The acceleration pedal reaction force output device 73, for example, outputs a force in a direction opposite to an operation direction (operation reaction force) to the acceleration pedal 71 in response to an instruction from the vehicle control system 100.

The brake pedal 74 is an operator that is used for receiving a deceleration instruction from a vehicle occupant. The brake depression amount sensor 75 detects a depression amount (or a depressing force) of the brake pedal 74 and outputs a brake signal representing a result of the detection to the vehicle control system 100.

The shift lever 76 is an operator that is used for receiving an instruction for changing a shift level from a vehicle occupant. The shift position sensor 77 detects a shift level instructed by a vehicle occupant and outputs a shift position signal representing a result of the detection to the vehicle control system 100.

The steering wheel 78 is an operator that is used for receiving a turning instruction from a vehicle occupant. The steering angle sensor 79 detects an operation angle of the steering wheel 78 and outputs a steering angle signal representing a result of the detection to the vehicle control system 100. The steering torque sensor 80 detects a torque applied to the steering wheel 78 and outputs a steering torque signal representing a result of the detection to the vehicle control system 100.

The other driving operation devices 81, for example, are a joystick, a button, a dial switch, a graphical user interface (GUI) switch, and the like. The other driving operation devices 81 accept an acceleration instruction, a deceleration instruction, a turning instruction, or the like and output the accepted instruction to the vehicle control system 100.

For the configuration of the non-driving operation system, the HMI 70, for example, includes a display device 82, a speaker 83, a contact operation detecting device 84, a content reproducing device 85, various operation switches 86, a seat 88, a seat driving device 89, a window glass 90, a window driving device 91, and a vehicle indoor camera 92.

The display device 82, for example, is a liquid crystal display (LCD), an organic electroluminescence (EL) display device, or the like attached to an arbitrary position facing an assistant driver's seat or a rear seat. In addition, the display device 82 may be a head up display (HUD) that projects an image onto a front windshield or any other window. The speaker 83 outputs speech. In a case in which the display device 82 is a touch panel, the contact operation detecting device 84 detects a contact position (touch position) on a display screen of the display device 82 and outputs the detected contact position to the vehicle control system 100. On the other hand, in a case in which the display device 82 is not a touch panel, the contact operation detecting device 84 may be omitted.

The content reproducing device 85, for example, includes a digital versatile disc (DVD) reproduction device, a compact disc (CD) reproduction device, a television set, a device for generating various guidance images, and the like. A part or all of each of the display device 82, the speaker 83, the contact operation detecting device 84, and the content reproducing device 85 may be configured to be shared by the navigation device 50.

The various operation switches 86 are disposed at arbitrary positions inside a vehicle cabin. The various operation switches 86 include a driving support changeover switch 87 that instructs starting (or starting in the future) and stopping of driving support. The driving support changeover switch 87 may be any one of a graphical user interface (GUI) switch and a mechanical switch. In addition, the various operation switches 86 may include switches used for driving the seat driving device 89 and the window driving device 91.

The seat 88 is a seat on which a vehicle occupant sits. The seat driving device 89 freely drives a reclining angle, a forward/backward position, a yaw rate, and the like of the seat 88. The window glass 90, for example, is disposed in each door. The window driving device 91 drives opening and closing of the window glass 90.

The vehicle indoor camera 92 is a digital camera that uses solid-state imaging devices such as CCDs or CMOSs. The vehicle indoor camera 92 is attached to a position such as a rearview mirror, a steering boss unit, or an instrument panel at which at least the head of a vehicle occupant performing a driving operation can be imaged. The vehicle indoor camera 92, for example, repeatedly images a vehicle occupant periodically.

Before description of the vehicle control system 100, the running driving force output device 200, the steering device 210, and the brake device 220 will be described.

The running driving force output device 200 outputs a running driving force (torque) used for running the vehicle to driving wheels. For example, the running driving force output device 200 includes an engine, a transmission, and an engine control unit (ECU) controlling the engine in a case in which the subject vehicle M is an automobile having an internal combustion engine as its power source, includes a running motor and a motor ECU controlling the running motor in a case in which the subject vehicle M is an electric vehicle having a motor as its power source, and includes an engine, a transmission, an engine ECU, a running motor, and a motor ECU in a case in which the subject vehicle M is a hybrid vehicle. In a case in which the running driving force output device 200 includes only an engine, the engine ECU adjusts a throttle opening degree, a shift level, and the like of the engine in accordance with information input from a running control unit 160 to be described later. On the other hand, in a case in which the running driving force output device 200 includes only a running motor, the motor ECU adjusts a duty ratio of a PWM signal given to the running motor in accordance with information input from the running control unit 160. In a case in which the running driving force output device 200 includes an engine and a running motor, an engine ECU and a motor ECU control a running driving force in cooperation with each other in accordance with information input from the running control unit 160.

The steering device 210, for example, includes a steering ECU and an electric motor. The electric motor, for example, changes the direction of a steering wheel by applying a force to a rack and pinion mechanism. The steering ECU changes the direction of the steering wheels by driving the electric motor in accordance with information input from the vehicle control system 100 or information of a steering angle or a steering torque that is input.

The brake device 220, for example, is an electric servo brake device including a brake caliper, a cylinder delivering hydraulic pressure to the brake caliper, an electric motor generating hydraulic pressure in the cylinder, and a brake control unit. The brake control unit of the electric servo brake device performs control of the electric motor in accordance with information input from the running control unit 160 such that a brake torque according to a braking operation is output to each vehicle wheel. The electric servo brake device may include a mechanism delivering hydraulic pressure generated by an operation of the brake pedal to the cylinder through a master cylinder as a backup. In addition, the brake device 220 is not limited to the electric servo brake device described above and may be an electronic control-type hydraulic brake device. The electronic control-type hydraulic brake device delivers hydraulic pressure of the master cylinder to the cylinder by controlling an actuator in accordance with information input from the running control unit 160. In addition, the brake device 220 may include a regenerative brake using the running motor which can be included in the running driving force output device 200.

[Vehicle Control System]

Hereinafter, the vehicle control system 100 will be described. The vehicle control system 100, for example, is realized by one or more processors or hardware having functions equivalent thereto. The vehicle control system 100 may be configured by combining an electronic control unit (ECU), a micro-processing unit (MPU), or the like in which a processor such as a central processing unit (CPU), a storage device, and a communication interface are interconnected through an internal bus.

Referring back to FIG. 4, hereinafter, driving support will be described as automated driving. The vehicle control system 100, for example, includes a target lane determining unit 110, a driving support control unit 120, a running control unit 160, and a storage unit 180. The driving support control unit 120, for example, includes a driving support mode control unit 130, a subject vehicle position recognizing unit 140, an external system recognizing unit 142, a control plan generating unit 144, a locus generating unit 146, and a switching control unit 150. Some or all of the target lane determining unit 110, each unit of the driving support control unit 120, and the running control unit 160 are realized by a processor executing a program (software). In addition, some or all of these may be realized by hardware such as a large scale integration (LSI) or an application specific integrated circuit (ASIC) or may be realized by combining software and hardware.

In the storage unit 180, for example, information such as high-accuracy map information 182, target lane information 184, control plan information 186, environment information 188, and the like is stored. The storage unit 180 is realized by a read only memory (ROM), a random access memory (RAM), a hard disk drive (HDD), a flash memory, or the like. A program executed by the processor may be stored in the storage unit 180 in advance or may be downloaded from an external device through in-vehicle Internet facilities or the like. In addition, a program may be installed in the storage unit 180 by mounting a portable-type storage medium storing the program in a drive device not illustrated in the drawing. Furthermore, the vehicle control system 100 may be distributed in a plurality of computer devices.

The target lane determining unit 110, for example, is realized by an MPU. The target lane determining unit 110 divides a route provided from the navigation device 50 into a plurality of blocks (for example, divides the route at every 100 [m] in the vehicle advancement direction) and determines a target lane for each block by referring to the high-accuracy map information 182. The target lane determining unit 110, for example, determines a lane in which the subject vehicle runs represented using a position from the left side. For example, in a case in which a branching point, a merging point, or the like is present in the route, the target lane determining unit 110 determines a target lane such that the subject vehicle M can run on a reasonable running route for advancing to a branching destination. The target lane determined by the target lane determining unit 110 is stored in the storage unit 180 as target lane information 184.

The high-accuracy map information 182 is map information having higher accuracy than that of the navigation map included in the navigation device 50. The high-accuracy map information 182, for example, includes information of the center of a lane or information of boundaries of a lane and the like. In addition, in the high-accuracy map information 182, road information, traffic regulation information, address information (an address and a postal code), facility information, telephone number information, and the like may be included. In the road information, information representing a type of road such as an expressway, a toll road, a national road, or a prefectural road and information such as the number of lanes of a road, a width of each lane, a gradient of a road, the position of a road (three-dimensional coordinates including longitude, latitude, and height), a curvature of the curve of a lane, locations of merging and branching points of lanes, signs installed on a road, and the like are included. In the traffic regulation information, information of closure of a lane due to roadwork, traffic accidents, congestion, or the like is included.

The environment information 188 includes information that causes changes in control of driving support among the information representing the state of the surroundings of the subject vehicle M. White lines drawn on a road on which the subject vehicle M is running or the brightness of light introduced to the subject vehicle M are examples of the information causing changes in control of the driving support. In the environment information 188, information received by the communication device 55 and information detected by the vehicle control system 100 are included.

The driving support mode control unit 130 determines a mode of automated driving performed by the driving support control unit 120 as one of driving support. Modes of automated driving according to this embodiment include the following modes. The followings are merely examples, and the number of the modes of automated driving may be arbitrarily determined.

[Mode A]

A mode A is a mode of which the degree of automated driving is the highest. The mode A may be rephrased as a mode of which the degree of driving support is the highest. In a case in which the mode A is executed, the entire vehicle control such as complicated merging control is automatically performed, and accordingly, a vehicle occupant does not need to monitor the vicinity or the state of the subject vehicle M.

[Mode B]

A mode B is a mode of which a degree of automated driving is the second highest next to the mode A. The mode B may be rephrased as a mode of which the degree of driving support is the second highest next to the mode A. In a case in which the mode B is executed, generally, the entire vehicle control is automatically performed, but a driving operation of the subject vehicle M may be given over to a vehicle occupant in accordance with situations. For this reason, the vehicle occupant needs to monitor the vicinity and the state of the subject vehicle M. [Mode C]

A mode C is a mode of which a degree of automated driving is the third highest next to the mode B. The mode C may be rephrased as a mode of which the degree of driving support is the third highest next to the mode B. In a case in which the mode C is executed, a vehicle occupant needs to perform a checking operation according to situations on the HMI 70. In the mode C, for example, in a case in which a timing for a lane change is notified to a vehicle occupant, and the vehicle occupant performs an operation of instructing a lane change for the HMI 70, automatic lane change is performed. For this reason, the vehicle occupant needs to monitor the vicinity and the state of the subject vehicle M.

The driving support mode control unit 130 determines a mode of automated driving on the basis of a vehicle occupant's operation on the HMI 70, an event determined by the control plan generating unit 144, a running mode determined by the locus generating unit 146, and the like. The mode of automated driving is notified to the HMI control unit 170. In addition, in the mode of automated driving, a limit according to the performance and the like of the detection device DD of the subject vehicle M may be set. For example, in a case in which the performance of the detection device DD is low, the mode A may not be executed. In any of the modes, switching to a manual driving mode (overriding) can be made by performing an operation on the configuration of the driving operation system of the HMI 70.

The subject vehicle position recognizing unit 140 of the driving support control unit 120 recognizes a lane (running lane) in which the subject vehicle M is running and a relative position of the subject vehicle M with respect to the running lane on the basis of the high-accuracy map information 182 stored in the storage unit 180 and information input from the finder 20, the radar 30, the camera 40, the navigation device 50, or the vehicle sensor 60.

For example, the subject vehicle position recognizing unit 140 compares a pattern of road partition lines recognized from the high-accuracy map information 182 (for example, an array of solid lines and broken lines) with a pattern of road partition lines in the vicinity of the subject vehicle M that has been recognized from an image captured by the camera 40, thereby recognizing a running lane. In the recognition, the position of the subject vehicle M acquired from the navigation device 50 or a result of the process executed by an INS may be additionally taken into account.

Figure 6:
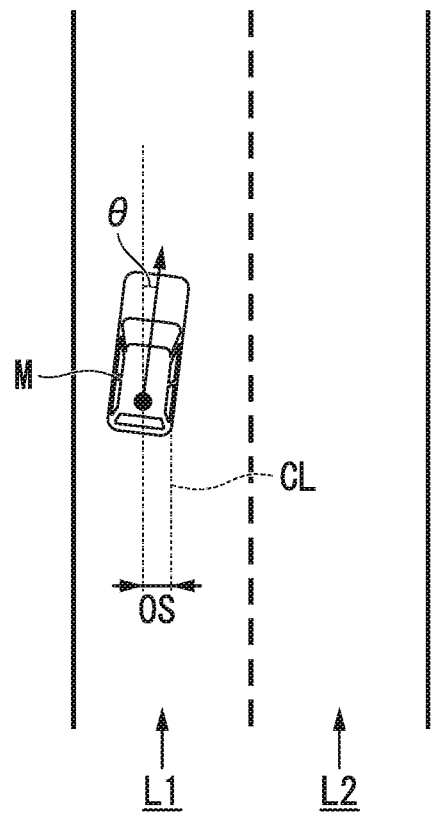
FIG. 6 is a diagram illustrating a view in which a relative position of a subject vehicle M with respect to a running lane L1 is recognized by a subject vehicle position recognizing unit 140.

FIG. 6 is a diagram illustrating a view in which a relative position of a subject vehicle M with respect to a running lane L1 is recognized by the subject vehicle position recognizing unit 140. For example, the subject vehicle position recognizing unit 140 recognizes an offset OS of a reference point (for example, the center of gravity) of the subject vehicle M from the center CL of the running lane and an angle θ of an advancement direction of the subject vehicle M formed with respect to a line along the center CL of the running lane as a relative position of the subject vehicle M with respect to the running lane L1. In addition, instead of this, the subject vehicle position recognizing unit 140 may recognize a position of a reference point on the subject vehicle M with respect to a side end part of the own lane L1 and the like as a relative position of the subject vehicle M with respect to the running lane. The relative position of the subject vehicle M recognized by a subject vehicle position recognizing unit 140 is provided to the target lane determining unit 110.

The external system recognizing unit 142 recognizes states of each surrounding vehicle such as a position, a speed, an acceleration, and the like thereof on the basis of information input from the finder 20, the radar 30, the camera 40, and the like. For example, a surrounding vehicle is a vehicle running in the vicinity of the subject vehicle M and is a vehicle running in the same direction as that of the subject vehicle M. The position of a surrounding vehicle may be represented as a representative point on another vehicle such as the center of gravity, a corner, or the like and may be represented by an area represented by the contour of another vehicle. The "state" of a surrounding vehicle is acquired on the basis of information of various devices described above and may include an acceleration of a surrounding vehicle and whether or not a lane is being changed (or whether or not a lane is to be changed). In addition, the external system recognizing unit 142 may recognize positions of a guard rail and a telegraph pole, a parked vehicle, a pedestrian, and other objects in addition to the surrounding vehicles.

The control plan generating unit 144 generates a control plan of the driving support control unit 120. In the control plan of the driving support control unit 120, for example, an action plan of automated driving, control conditions of driving support, a target locus of the subject vehicle M in a case in which the control conditions are satisfied, and the like are included.

The control plan generating unit 144 sets a start point of automated driving and/or a destination of the automated driving as an action plan of the automated driving. The start point of automated driving may be the current position of the subject vehicle M or a point at which an operation instructing automated driving is performed. The control plan generating unit 144 generates an action plan of the automated driving for a section between the start point and a destination of the automated driving. The section is not limited thereto, and the control plan generating unit 144 may generate an action plan for an arbitrary section.

The action plan of the automated driving, for example, is configured of a plurality of events that are sequentially executed. The events, for example, include a deceleration event of decelerating the subject vehicle M, an acceleration event of accelerating the subject vehicle M, a lane keeping event of causing the subject vehicle M to run without deviating from a running lane, a lane changing event of changing a running lane, an overtaking event of causing the subject vehicle M to overtake a vehicle running ahead, a branching event of changing lane to a desired lane at a branching point or causing the subject vehicle M to run without deviating from a current running lane, a merging event of accelerating/decelerating the subject vehicle M and changing a running lane in a merging lane for merging into a main lane, and a handover event of transitioning to a manual driving mode to an automated driving mode at a start point of automated driving or transitioning from the automated driving mode to the manual driving mode at a planned end point of automated driving, and the like. The control plan generating unit 144 sets a lane changing event, a branching event, or a merging event at a place at which a target lane determined by the target lane determining unit 110 is changed. Information representing the action plan generated by the control plan generating unit 144 is stored in the storage unit 180 as control plan information 186.

Figure 7:
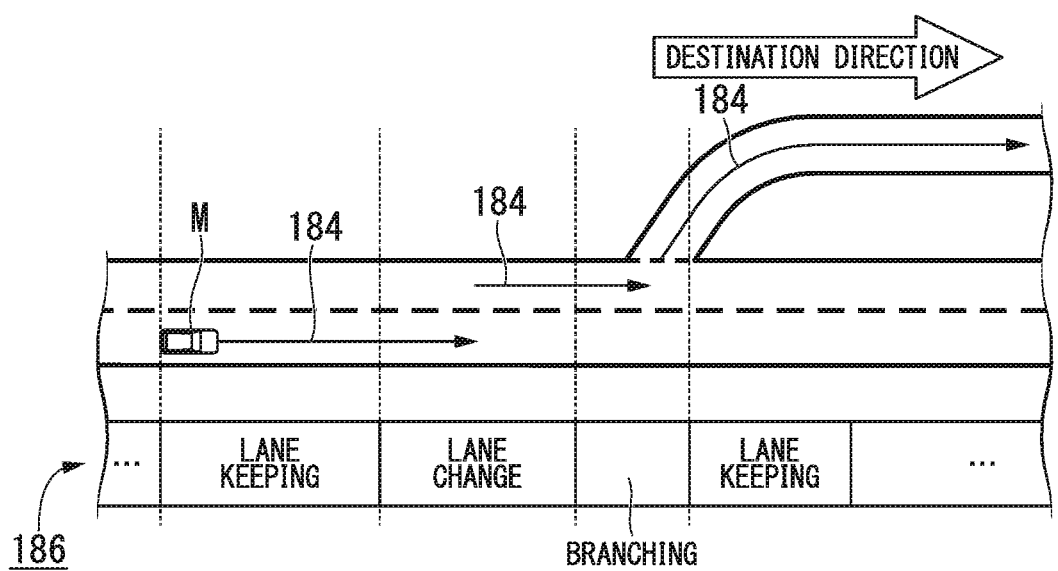
FIG. 7 is a diagram illustrating one example of an action plan in automated driving that is generated for a certain section.

FIG. 7 is a diagram illustrating one example of an action plan generated for a certain section. As illustrated in the drawing, the control plan generating unit 144 generates an action plan that is necessary for the subject vehicle M to run on a target lane indicated by the target lane information 184. In addition, the control plan generating unit 144 may dynamically change the action plan in accordance with a change in the status of the subject vehicle M regardless of the target lane information 184. For example, in a case in which a speed of a surrounding vehicle recognized during the running of the vehicle by the external system recognizing unit 142 exceeds a threshold, or a moving direction of a surrounding vehicle running on a lane adjacent to the own lane (running lane) is directed toward the direction of the own lane, the control plan generating unit 144 may change the event set in a driving section on which the subject vehicle M plans to run. For example, in a case in which an event is set such that a lane changing event is executed after a lane keeping event, when it is determined that a vehicle is running at a speed that is a threshold or more from the behind in a lane that is a lane change destination during the lane keeping event in accordance with a result of the recognition of the external system recognizing unit 142, the control plan generating unit 144 may change the next event after a lane keeping event from a lane changing event to a deceleration event, a lane keeping event, or the like. As a result, also in a case in which a change in the state of the external system occurs, the vehicle control system 100 can cause the subject vehicle M to safely run automatically.

Figure 8:
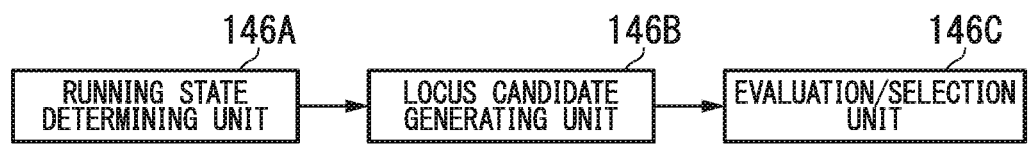
FIG. 8 is a diagram illustrating one example of the configuration of a locus generating unit 146.

As illustrated in FIG. 8, the locus generating unit 146, for example, includes a running mode determining unit 146A, a locus candidate generating unit 146B, and an evaluation/selection unit 146C.

When the lane keeping event is executed, the running mode determining unit 146A determines one running mode among constant-speed running, following running, low-speed following running, decelerating running, curve running, obstacle avoidance running, and the like. In this case, in a case in which another vehicle is not present in front of the subject vehicle M, the running mode determining unit 146A determines constant-speed running as the running mode. In addition, in a case in which following running for a vehicle running ahead is to be executed, the running mode determining unit 146A determines following running as the running mode. In addition, in the case of a congestion situation or the like, the running mode determining unit 146A determines low-speed following running as the running mode. Furthermore, in a case in which deceleration of a vehicle running ahead is recognized by the external system recognizing unit 142 or in a case in which an event of stopping, parking, or the like is to be executed, the running mode determining unit 146A determines decelerating running as the running mode. In addition, in a case in which the subject vehicle M is recognized to have reached a curved road by the external system recognizing unit 142, the running mode determining unit 146A determines the curve running as the running mode. Furthermore, in a case in which an obstacle is recognized in front of the subject vehicle M by the external system recognizing unit 142, the running mode determining unit 146A determines the obstacle avoidance running as the running mode. In addition, in a case in which the lane changing event, the overtaking event, the branching event, the merging event, the handover event, or the like are executed, the running mode determining unit 146A determines a running mode according to each event.

Figure 9:
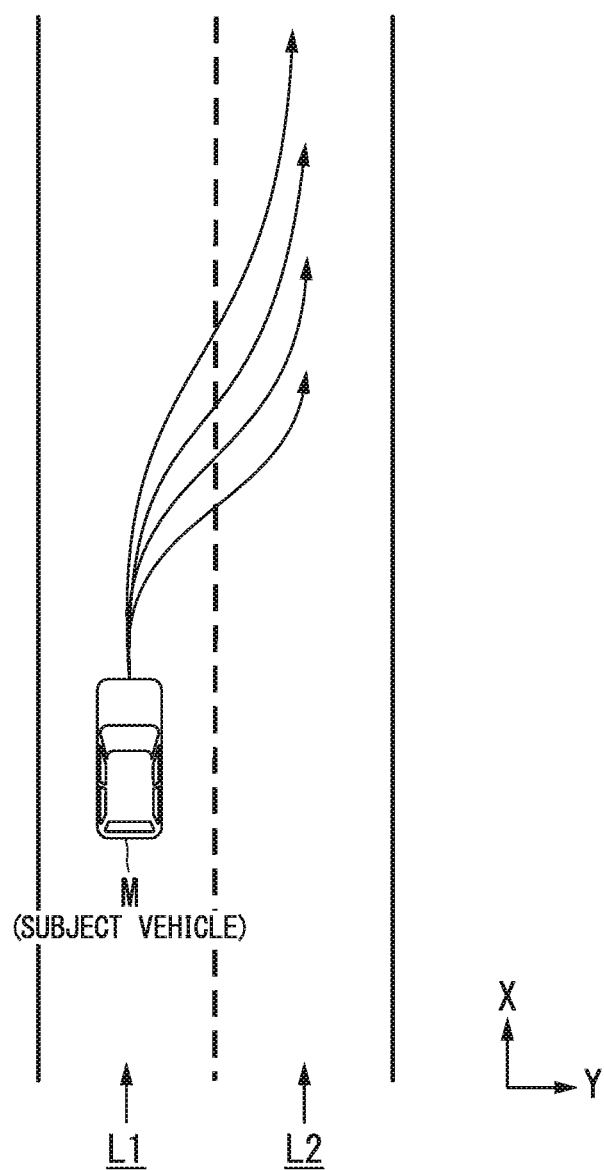
FIG. 9 is a diagram illustrating one example of candidates for a locus generated by a locus candidate generating unit 146B.

The locus candidate generating unit 146B generates candidates for a locus on the basis of the running mode determined by the running mode determining unit 146A. FIG. 9 is a diagram illustrating one example of candidates for a locus that are generated by the locus candidate generating unit 146B. FIG. 9 illustrates candidates for loci generated in a case in which a subject vehicle M changes lanes from a lane L1 to a lane L2.

Figure 10:
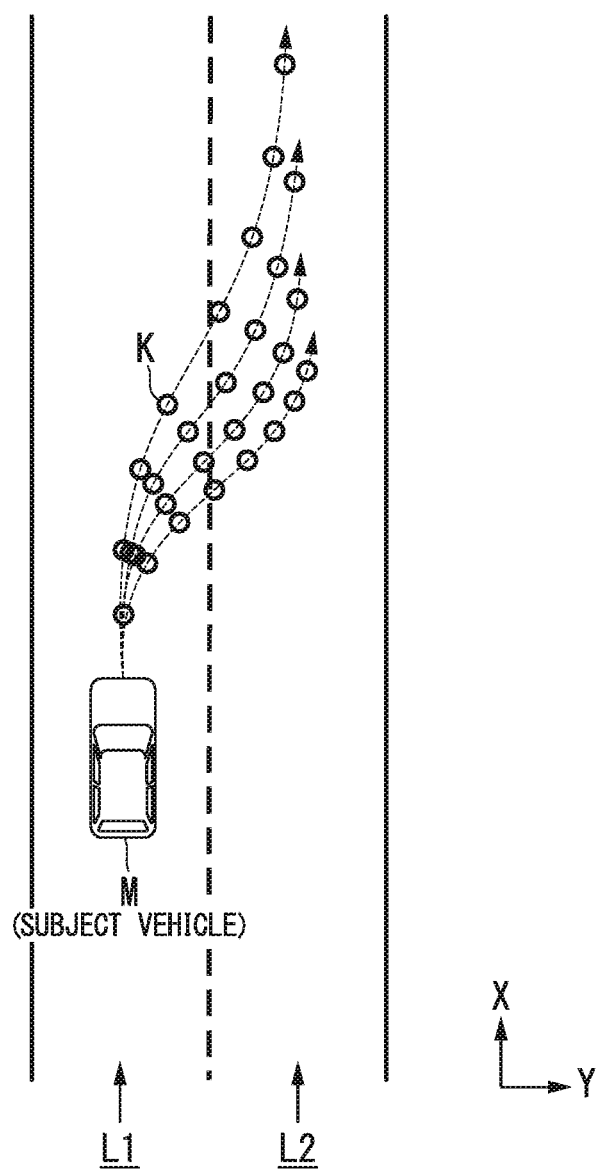
FIG. 10 is a diagram in which candidates for a locus generated by the locus candidate generating unit 146B are represented using locus points K.

The locus candidate generating unit 146B, for example, determines loci as illustrated in FIG. 9 as aggregations of target positions (locus points K) that the reference position (for example, the center of gravity or the center of a rear wheel shaft) of the subject vehicle M will reach at predetermined times in the future. FIG. 10 is a diagram in which candidates for a locus generated by the locus candidate generating unit 146B are represented using locus points K. As a gap between the locus points K becomes wider, the speed of the subject vehicle M increases. On the other hand, as a gap between the locus points K becomes narrower, the speed of the subject vehicle M decreases. Thus, in a case in which acceleration is desired, the locus candidate generating unit 146B gradually increases the gap between the locus points K. On the other hand, in a case in which deceleration is desired, the locus candidate generating unit 146B gradually decreases the gap between the locus points.

In this way, since the locus points K include a speed component, the locus candidate generating unit 146B needs to give a target speed to each of the locus points K. The target speed is determined in accordance with the running mode determined by the running mode determining unit 146A.

Figure 11:
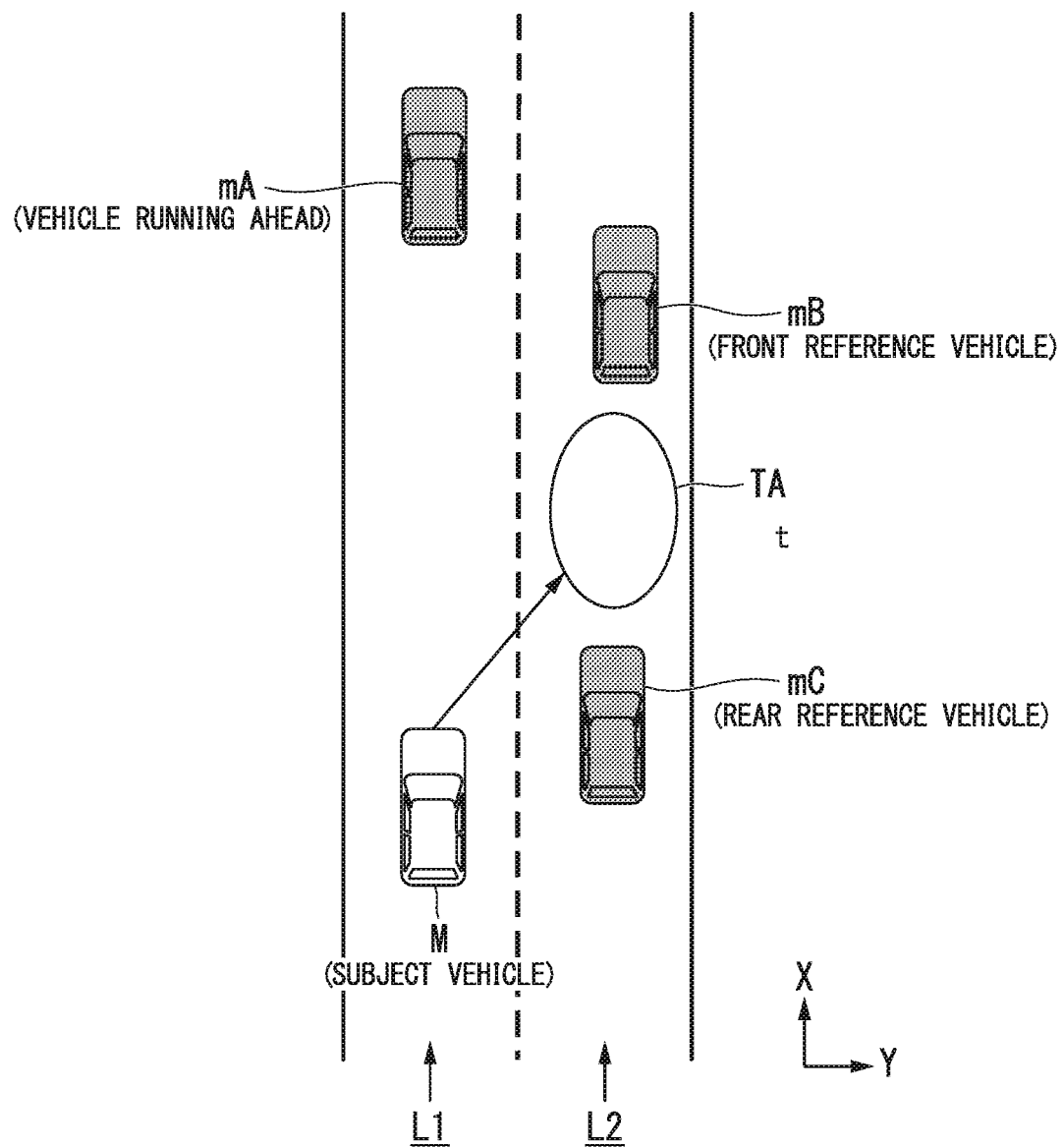
FIG. 11 is a diagram illustrating a lane change target position TA.

Here, a technique for determining a target speed in a case in which a lane change (including branching) is performed will be described. The locus candidate generating unit 146B, first, sets a lane change target position (or a merging target position). The lane change target position is set as a relative position with respect to a surrounding vehicle and is for determining "surrounding vehicles between which a lane change is performed." The locus candidate generating unit 146B determines a target speed of a case in which a lane change is performed focusing on three surrounding vehicles using the lane change target position as a reference. FIG. 11 is a diagram illustrating a lane change target position TA. In the drawing, an own lane L1 is illustrated, and an adjacent lane L2 is illustrated. Here, in the same lane as that of the subject vehicle M, a surrounding vehicle running immediately before the subject vehicle M will be defined as a vehicle mA running ahead, a surrounding vehicle running immediately before the lane change target position TA will be defined as a front reference vehicle mB, and a surrounding vehicle running immediately after the lane change target position TA will be defined as a rear reference vehicle mC. When the subject vehicle M needs to perform acceleration/deceleration for movement to the lateral side of the lane change target position TA, at this time, overtaking the vehicle mA running ahead needs to be avoided. For this reason, the locus candidate generating unit 146B predicts future states of the three surrounding vehicles and sets a target speed such that there is no interference with each of the surrounding vehicles.

Figure 12:
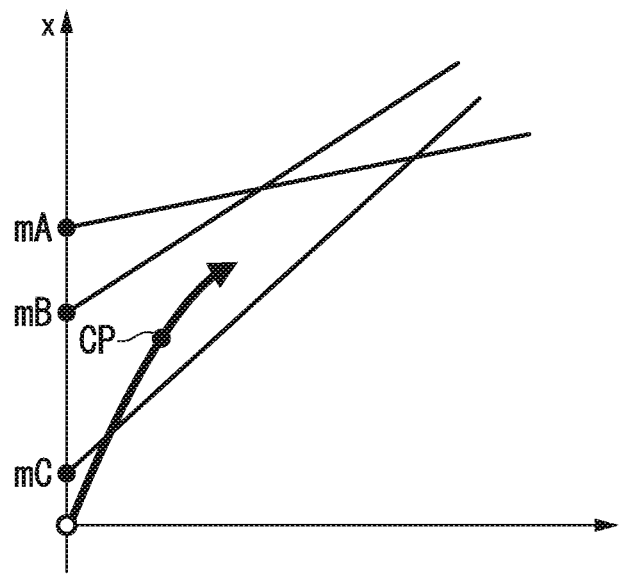
FIG. 12 is a diagram illustrating a speed generation model in a case in which speeds of three surrounding vehicles are assumed to be constant.

FIG. 12 is a diagram illustrating a speed generation model of a case in which the speeds of three surrounding vehicles are assumed to be constant. In the drawing, straight lines extending from mA, mB, and mC respectively represent displacements in the advancement direction in a case in which each of the surrounding vehicles is assumed to run at a constant speed. At a point CP at which the lane change is completed, the subject vehicle M needs to be present between the front reference vehicle mB and the rear reference vehicle mC and needs to be present behind the vehicle mA running ahead before that. Under such restrictions, the locus candidate generating unit 146B derives a plurality of time series patterns of the target speed until the lane change is completed. Then, by applying the time series patterns of the target speed to a model of a spline curve or the like, a plurality of candidates for loci as illustrated in FIG. 9 are derived. In addition, the movement patterns of the three surrounding vehicles are not limited to the constant speeds as illustrated in FIG. 12 and may be predicted on the premise of constant accelerations or constant jerks (derivatives of accelerations).

The evaluation/selection unit 146C performs evaluations for the generated candidates for the locus generated by the locus candidate generating unit 146B, for example, from two viewpoints of planning and safety and selects a locus to be output to the running control unit 160. From the viewpoint of the planning, for example, a locus is evaluated to be high in a case in which the followability for a plane that has already been generated (for example, an action plan) is high, and the total length of the locus is short. For example, in a case in which it is desirable to perform a lane change to the right side, a locus in which a lane change to the left side is performed once, and then, the subject vehicle is returned has a low evaluation. From the viewpoint of the safety, for example, in a case in which, at each locus point, a distance between the subject vehicle M and an object (a surrounding vehicle or the like) is long, and the acceleration/deceleration and the amounts of changes in the steering angle are small, the locus is evaluated to be high.

The switching control unit 150 performs switching between the automated driving mode and the manual driving mode on the basis of a signal input from the automated driving changeover switch 87. In addition, the switching control unit 150 switches the driving mode from the automated driving mode to the manual driving mode on the basis of an operation instructing acceleration, deceleration, or steering for the configuration of the driving operation system of the HMI 70. For example, in a case in which a state in which the amount of operation represented by a signal input from the configuration of the driving operation system of the HMI 70 exceeds a threshold is continued for a reference time or more, the switching control unit 150 switches the driving mode from the automated driving mode to the manual driving mode (overriding). In addition, in a case in which an operation for the configuration of the driving operation system of the HMI 70 has not been detected for a predetermined time after the switching to the manual driving mode according to the overriding, the switching control unit 150 may return the driving mode to the automated driving mode.

The running control unit 160 performs control of the running driving force output device 200, the steering device 210, and the brake device 220 such that the subject vehicle M passes through the locus generated by the locus generating unit 146 at a planned time.

While the automated driving has been described, the driving support may be any aspect other than the automated driving. For example, the driving support mode control unit 130 may determine control of driving support other than the automated driving. In the control of the driving support other than the automated driving, control of supporting a driving operation of keeping a lane in which the subject vehicle M is running may be included. In such a case, the driving support mode control unit 130 may control switching between start and end of driving support without using the target lane determining unit 110, the switching control unit 150, the high-accuracy map information 182, and the target lane information 184.

In the control of driving support other than the automated driving, control of suppressing the subject vehicle M from deviating from a road on which the subject vehicle M is running and controlling of a running speed with an inter-vehicle distance from a vehicle running ahead of the subject vehicle M maintained may be included. In such a case, the driving support mode control unit 130 controls switching between start and end of the driving support without using the target lane determining unit 110, the subject vehicle position recognizing unit 140, the switching control unit 150, the high-accuracy map information 182, and the target lane information 184.

When the information of a mode of the automated driving is notified by the driving support control unit 120, the HMI control unit 170 controls the HMI 70 in accordance with a type of mode of the automated driving.

Figure 13:
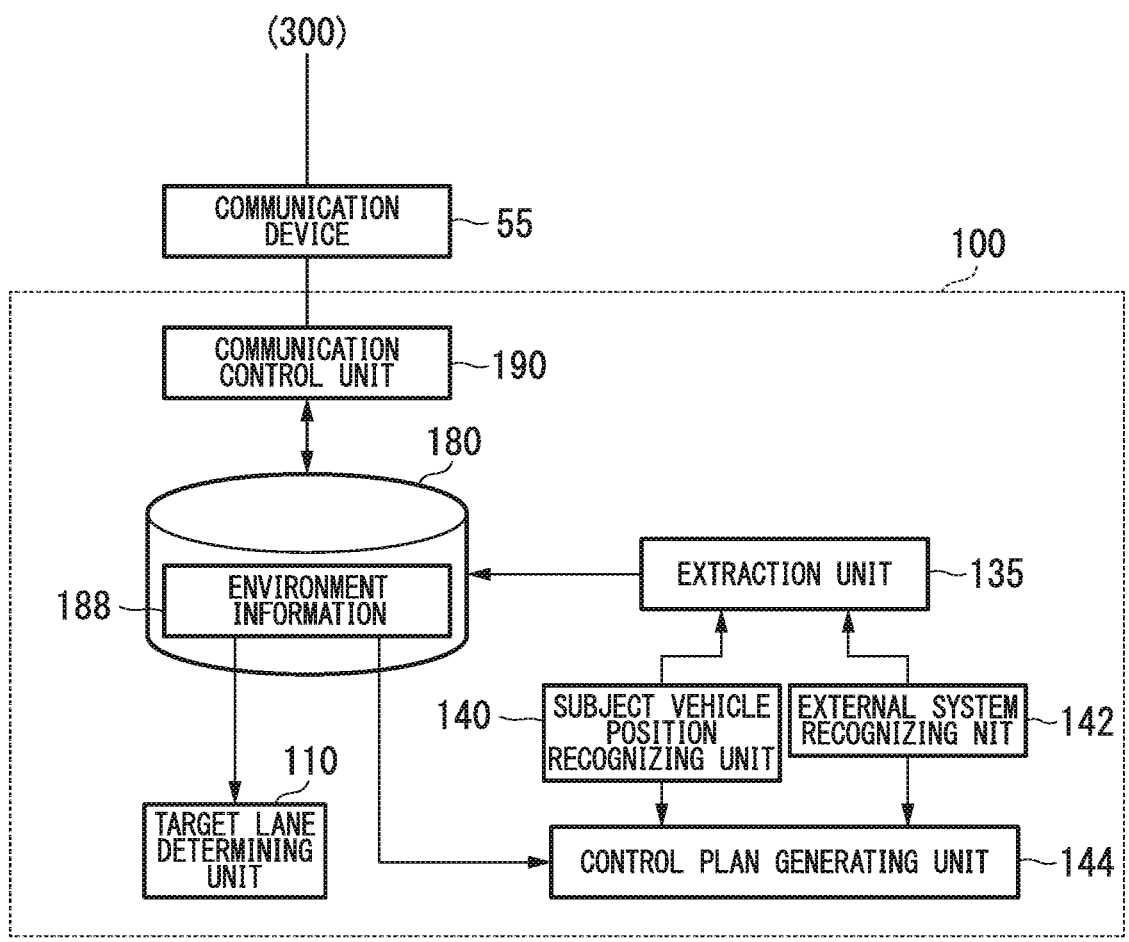
FIG. 13 is a diagram illustrating one example of a configuration focusing on an extraction unit 135 in the first embodiment.

Hereinafter, changing of an action of the subject vehicle M according to the first embodiment on the basis of the environment information will be described. FIG. 13 is a diagram illustrating one example of a configuration focusing on an extraction unit 135 in the first embodiment. The vehicle control system 100 further includes the extraction unit 135 and a communication control unit 190 in addition to the units described above.

The extraction unit 135 is realized by a processor such as a CPU executing a program. Recognition results are supplied to the extraction unit 135 from the subject vehicle position recognizing unit 140 and the external system recognizing unit 142.

The subject vehicle position recognizing unit 140 tracks the state of a road partition line in a state in which a relative position of the subject vehicle M. The extraction unit 135 determines that the state of the road partition line recognized by the subject vehicle position recognizing unit 140 has changed. The extraction unit 135, for example, determines that a state such as presence/absence of a road partition line, a state in which a road partition line becomes blurred, a type of road partition line, or the like has changed from a state that was continuously been detected to another state as a change in the state of the road partition line.

The external system recognizing unit 142 monitors a state of the surroundings of the subject vehicle M in addition to surrounding vehicles. The extraction unit 135, for example, determines a state of a guard rail or an electric post, light introduced to the subject vehicle M, light emitted to a spot from a large lighting equipment installed on a construction site or the like at night, an obstacle such as a fallen object on a road, or presence/absence of a parked vehicle has changed from a state that was continuously detected to another state. In addition, the extraction unit 135 may recognize the brightness of light introduced to the subject vehicle M by recognizing a change in the brightness of image information received from the camera 40.

Furthermore, the subject vehicle position recognizing unit 140 and the external system recognizing unit 142 monitor a change in the signal supplied from the detection device DD and determine whether or not the change in the signal has exceeded a predetermined abnormality value. The abnormality value is set for each of the finder 20, the radar 30, and the camera 40. In a case in which the change in the signal exceeds the predetermined abnormality value, the subject vehicle position recognizing unit 140 and the external system recognizing unit 142 determines that the detection device DD that has output the signal malfunctions.

The extraction unit 135 extracts environment information relating to a change in environments from information recognized by the subject vehicle position recognizing unit 140 and the external system recognizing unit 142. The environment information relating to a change in the environments is information representing that a state of the surroundings of the subject vehicle M has changed from a state that was continuously detected to another state. For example, when the subject vehicle M is running, in a case in which a road partition line that has continuously been detected disappears, the extraction unit 135 determines a change from the state in which the road partition line is continuously detected to another state.

The extraction unit 135 stores the extracted environment information 188 in the storage unit 180. The extraction unit 135 stores the environment information 188 in which a place and a detection date and time are associated with the state of the surroundings of the subject vehicle M in the storage device 180. In addition, although the extraction unit 135 may associate a place and a detection date and time with the state of the surroundings of the subject vehicle M, the association is not limited thereto, and thus, the extraction unit 135 may associate only a place with a state of the surroundings of the subject vehicle M.

The extraction unit 135, for example, extracts information representing a change from a state in which a road partition line is detected to a state in which the road partition line is not detected as the environment information 188. In addition, the extraction unit 135 may extract information representing a change from a state in which a road partition line is a solid line to a state in which a road partition line is a dotted line as the environment information 188. In addition, the extraction unit 135 may extract information representing a stepwise rise of the brightness of light introduced to the subject vehicle M or a stepwise fall of the brightness as the environment information 188.

The extraction unit 135 excludes a change in information not relating to environments from the environment information 188 included in the information of the state of the surroundings of the subject vehicle recognized by the subject vehicle position recognizing unit 140 and the external system recognizing unit 142. In a case in which a malfunction of the detection device DD is detected, the extraction unit 135 excludes information detected by the detection device DD of which the malfunction has been detected from the environment information 188 as information not relating to environments. In addition, the extraction unit 135, for example, excludes image information that has been changed due to contamination of a lens of the camera 40 through which light is incident from the environment information 188 as information not relating to environments.

The communication control unit 190 is realized by a processor such as a CPU executing a program. The communication control unit 190 transmits the environment information 188 extracted by the extraction unit 135 to the server apparatus 300 using the communication device 55. In addition, the communication control unit 190 requests environment information relating to a road on which the subject vehicle M is running from the server apparatus 300 using the communication device 55. The communication control unit 190 stores the environment information that is received in response to the request from the server apparatus 300 and is received using the communication device 55 in the storage unit 180.

The vehicle control system 100 determines whether or not the action of the subject vehicle M is to be changed on the basis of the environment information 188 received by the communication device 55 and stored in the storage unit 180. The vehicle control system 100, for example, changes a target lane determined by the target lane determining unit 110 as an action of the subject vehicle M. In addition, the vehicle control system 100 changes an action plan generated by the control plan generating unit 144 as an action of the subject vehicle M. In a case in which a target lane is to be changed, the target lane determining unit 110 rewrites the target lane information 184 stored in the storage unit 180. In a case in which the action plan is to be changed, the control plan generating unit 144 rewrites the control plan information 186 stored in the storage unit 180.

Figure 14:
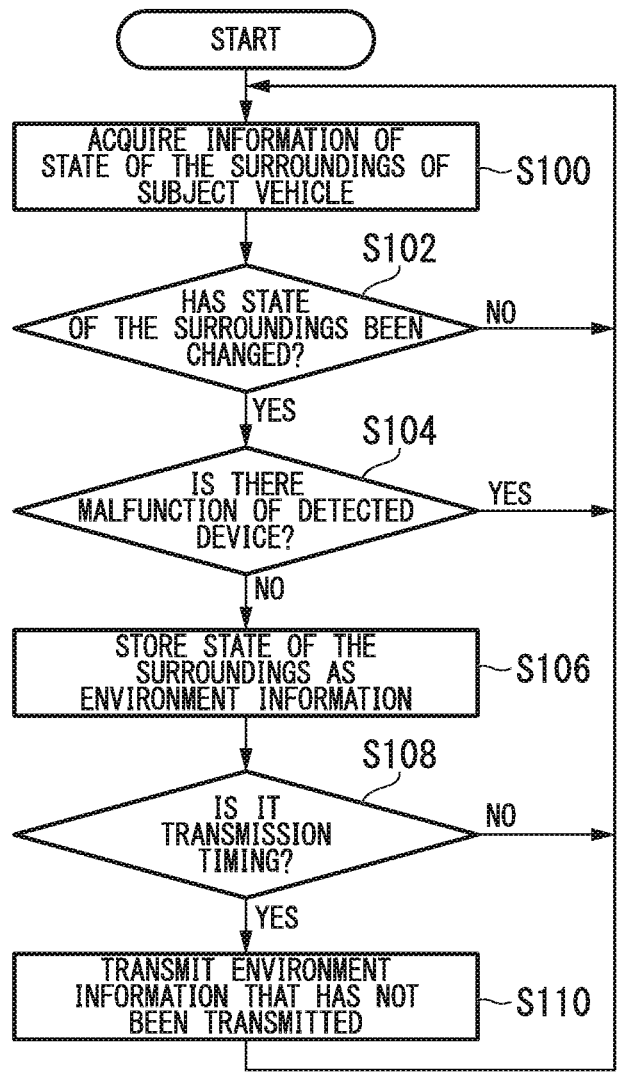
FIG. 14 is a flowchart illustrating one example of a flow of transmitting environment information 188 to a server apparatus 300 according to the first embodiment.

FIG. 14 is a flowchart illustrating one example of a flow of transmitting environment information 188 to the server apparatus 300 according to the first embodiment. First, the extraction unit 135 acquires information of the state of the surroundings of the subject vehicle M recognized by the subject vehicle position recognizing unit 140 and the external system recognizing unit 142 (Step S100). The extraction unit 135 determines whether or not the acquired state of the surroundings of the subject vehicle M has been changed (Step S102). In a case in which the state of the surroundings of the subject vehicle M has not been changed, the extraction unit 135 returns the process to Step S100.

On the other hand, in a case in which the state of the surroundings has been changed, the extraction unit 135 determines whether or not there is a malfunction of the detection device DD using the subject vehicle position recognizing unit 140 and the external system recognizing unit 142 (Step S104). The extraction unit 135 determines whether or not there is a malfunction of the detection device DD that has detected a signal that is a recognition source of the changed state of the surroundings of the subject vehicle M. For example, in a case in which a state of a road partition line has been changed, the extraction unit 135 determines whether or not there is a malfunction of the camera 40.

In a case in which there is a malfunction of the detection device DD, the extraction unit 135 returns the process to Step S100. In other words, the change in the state of the surroundings of the subject vehicle M is not on the basis of a change in the environment, and accordingly, the extraction unit 135 excludes the information from the environment information 188.

Figure 15:
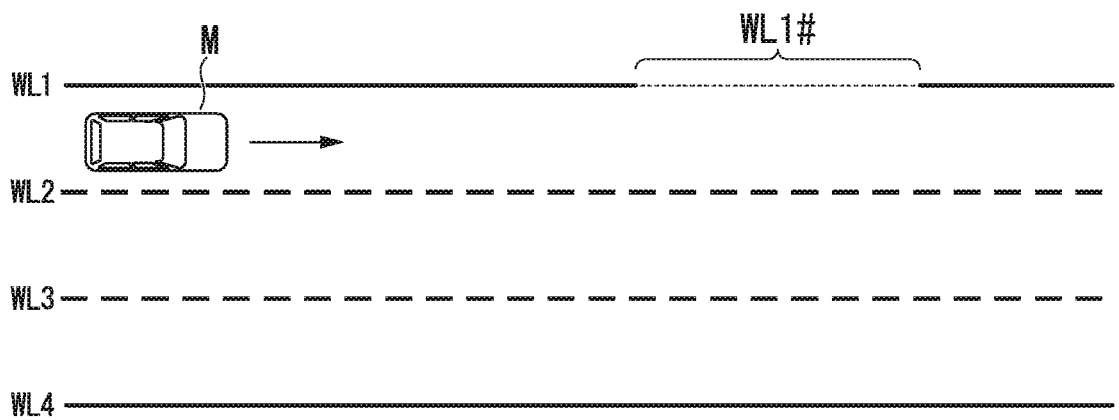
FIG. 15 is a diagram illustrating a view in which a left white line WL1 of a lane, in which a subject vehicle M is running, is lost among white lines WL1 to WL4 of a road on which the subject vehicle M is running

In a case in which there is no malfunction of the detection device DD, the extraction unit 135 stores the state of the surroundings of the subject vehicle M in the storage unit 180 as the environment information 188 (Step S106). FIG. 15 is a diagram illustrating a view in which a left white line WL1 of a lane, in which a subject vehicle M is running, is lost among white lines WL1 to WL4 of a road on which the subject vehicle M is running. In a case in which there is a section (WL1 #) in which the white line WL1 is lost, the subject vehicle position recognizing unit 140 cannot recognize the road partition line. In such a case, the extraction unit 135 stores information representing that the road partition line is lost and information of a place and a detection date and time in the storage unit 180 as the environment information 188.

The communication control unit 190 determines whether or not it has arrived at a transmission timing of the environment information 188, which is stored by the extraction unit 135, in the information stored in the storage unit 180 (Step S108). The communication control unit 190, for example, determines a timing at which new environment information 188 is stored in the storage unit 180 as a transmission timing of the environment information 188. In addition, the communication control unit 190 may determine a timing at which the process load of the vehicle control system 100 is low as a transmission timing of the environment information 188. In a case in which it has not arrived at the transmission timing of the environment information 188, the communication control unit 190 returns the process to Step S100.

On the other hand, in a case in which it is determined that it has arrived at the transmission timing of the environment information 188, the communication control unit 190 transmits the environment information 188, which has not been transmitted, to the server apparatus 300 using the communication device 55 (Step S110).

As described above, according to the vehicle control system 100 of the first embodiment, the environment information relating to a change in the environment is extracted from information of the state of the surroundings of the subject vehicle M that has been detected by the detection device DD, and the extracted environment information is transmitted to the server apparatus 300. According to this vehicle control system 100, by transmitting the environment information 188 from the server apparatus 300 to another subject vehicle M, automated driving responding to a change in the running environment can be executed.

In addition, according to the vehicle control system 100, in a case in which a malfunction of the detection device DD is detected by the subject vehicle position recognizing unit 140 and the external system recognizing unit 142, information detected using the detection device DD of which the malfunction has been detected is excluded from the environment information 188. In this way, according to the vehicle control system 100, it can be suppressed to transmit information not relating to a change in the state of the surroundings of the subject vehicle M to the server apparatus 300 as the environment information 188.

Figure 16:
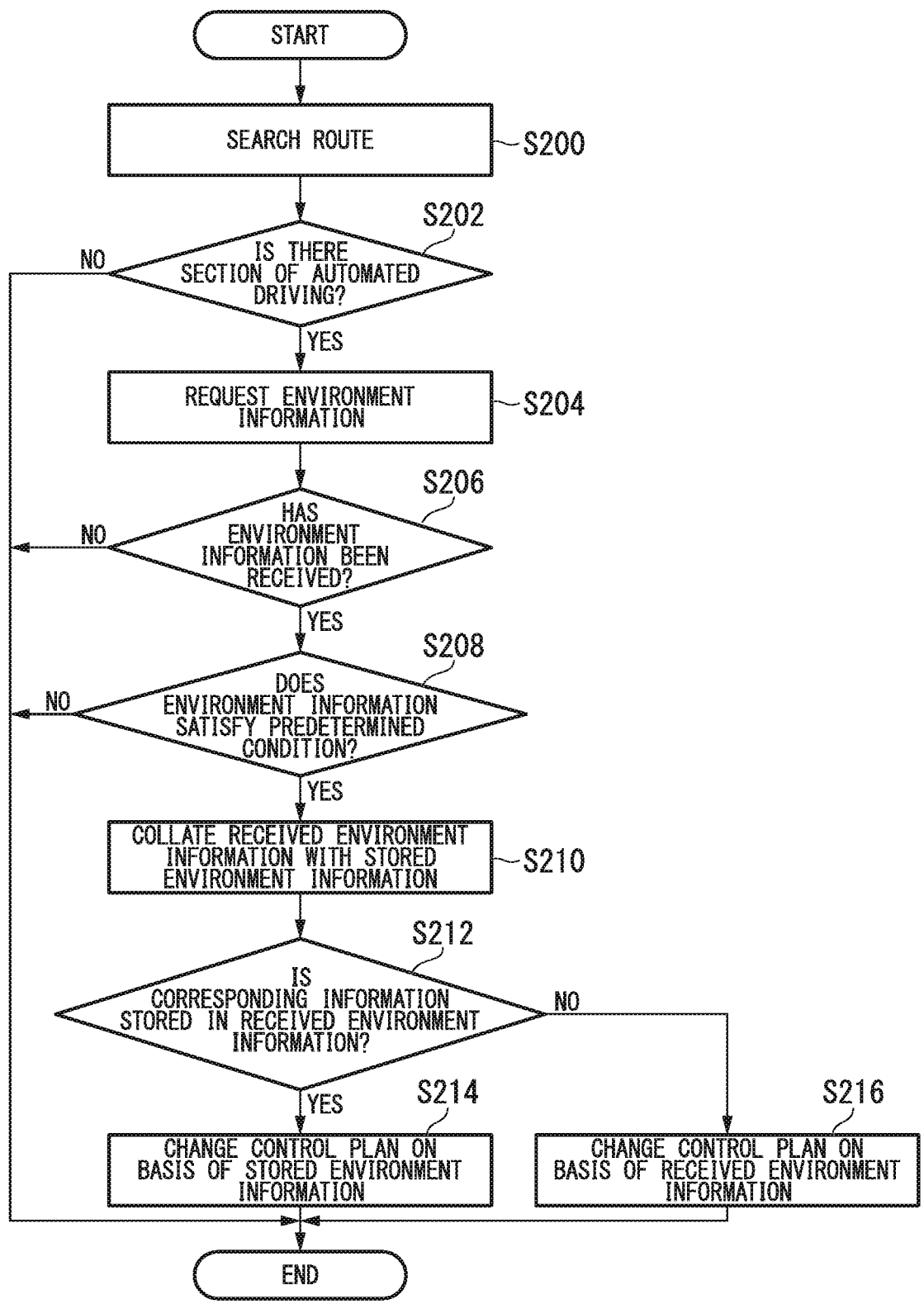
FIG. 16 is a flowchart illustrating one example of a flow of changing an action of a subject vehicle M on the basis of environment information received from a server apparatus 300 in the first embodiment.

Hereinafter, it will be described to request environment information from the server apparatus 300 and change a plan of automated driving on the basis of the environment information received in response to the request. FIG. 16 is a flowchart illustrating one example of a flow of changing an action of the subject vehicle M on the basis of environment information received from the server apparatus 300 in the first embodiment.

First, the vehicle control system 100 determines an action of the subject vehicle M on the basis of a route retrieved by the navigation device 50 (Step S200). The vehicle control system 100 generates a control plan using the control plan generating unit 144 as an action of the subject vehicle M and determines a target lane of the subject vehicle M using the target lane determining unit 110. The control plan generating unit 144 sets a start place of the automated driving and/or a destination of the automated driving. In addition, the target lane determining unit 110 determines a target lane for each predetermined section of the route retrieved by the navigation device 50.

Next, the vehicle control system 100 determines whether or not a section in which the automated driving is executed has been set using the control plan generating unit 144 (Step S202). In a case in which a section in which automated driving is executed has not been set, the communication control unit 190 ends the process without transmitting a request for the environment information to the server apparatus 300.

On the other hand, in a case in which a section in which the automated driving is executed has been set, the communication control unit 190 transmits a request for the environment information to the server apparatus 300 using the communication device 55 (Step S204). The communication control unit 190, for example, adds position information representing the section in which the automated driving is executed to the request. The server apparatus 300 compares the position information added to the request with a place included in the environment information 332. The server apparatus 300 extracts environment information corresponding to the place included in the position information added to the request and replies to the vehicle control system 100.

The communication control unit 190 determined whether or not the environment information received in response to the request has been received (Step S206). In a case in which the environment information cannot be received, the communication control unit 190 ends the process. On the other hand, in a case in which the environment information has been received, the communication control unit 190 determines whether or not the received environment information satisfies a predetermined condition (Step S208). For example, in a case in which the number of times the environment information 332 has been updated in the server apparatus 300 is equal to or greater than a threshold, the communication control unit 190 determines that the received environment information satisfies the predetermined condition. In addition, for example, in a case in which an elapsed time from a time at which the environment information 332 is detected by the server apparatus 300 is less than a threshold, the communication control unit 190 may determine that the received environment information satisfies the predetermined condition. The communication control unit 190 determines that the received environment information satisfies the predetermined condition on the basis of the number of times of update or a detection date and time added to the received environment information. In a case in which the received environment information does not satisfy the predetermined condition, the communication control unit 190 ends the process.

In a case in which it is determined that the received environment information satisfies the predetermined condition, the communication control unit 190 collates the received environment information with the environment information 188 stored in the storage unit 180 (Step S210). The communication control unit 190 determines whether or not the environment information 188 corresponding to the received environment information is stored in the storage unit 180 (Step S212). For example, in a case in which both the received environment information and the stored environment information 188 are environment information representing a loss of a road partition line at the same place within a predetermined period (for example, within several hours), the communication control unit 190 determines that the environment information 188 corresponding to the received environment information is stored in the storage unit 180.

In the case in which it is determined that the environment information 188 corresponding to the received environment information is stored in the storage unit 180, the communication control unit 190 changes the action of the subject vehicle M on the basis of the stored environment information 188 (Step S214). On the other hand, in a case in which it is determined that the environment information 188 corresponding to the received environment information is not stored in the storage unit 180, the communication control unit 190 changes the action of the subject vehicle M on the basis of the received environment information 188 (Step S216).

The vehicle control system 100, for example, changes the action of the subject vehicle M by executing the following process. For example, in a case in which a road partition line has been lost, the control plan generating unit 144 continues the automated driving regardless of the lost road partition line. In this case, the control plan generating unit 144 dynamically prohibits an operation of changing the control plan. In addition, in a case in which the road partition line has been lost, the target lane determining unit 110 changes a lane other than a lane in which the road partition line has been lost as a target lane. In this case, the target lane determining unit 110 rewrites the target lane information 184 with the target lane after the change. In addition, for example, in a case in which the subject vehicle runs in a direction in which light is introduced, the control plan generating unit 144 continues driving support such that the degree of driving support is not lowered.

As described above, according to the vehicle control system 100 of the first embodiment, the action of the subject vehicle M can be changed on the basis of the environment information received from the server apparatus 300. In this way, according to the vehicle control system 100, driving support responding to a change in the running environment can be executed.

In addition, according to this vehicle control system 100, in a case in which the received environment information satisfies a predetermined condition, driving support is executed on the basis of the received environment information, and accordingly, the driving support can be executed on the basis of the environment information, which has high reliability, detected over a plurality of number of times. In this way, according to the vehicle control system 100, driving support responding to an environment having a high likelihood of being already changed can be executed. For example, in a case in which a white line is blurred and cannot be recognized by the vehicle control system 100, there is a high likelihood that the blurring of the white line is detected by many subject vehicles M, and the environment information is updated a plurality of number of times in the server apparatus 300. In contrast to this, the vehicle control system 100 changes the action of the subject vehicle M on the basis of the environment information of which the number of times of update exceeds a threshold, and accordingly, it can be suppressed to change the control plan of the subject vehicle M on the basis of the environment that has not been changed.

In addition, according to the vehicle control system 100, by changing the action of the subject vehicle M using environment information that is information within a predetermined period from a time at which the environment information has been detected, driving support responding to an environment changing in a short period such as several hours or several days can be executed, and the driving support can be executed using information having high freshness and high reliability.

Furthermore, according to the vehicle control system 100, in a case in which the environment information received from the server apparatus 300 is stored in the environment information stored in the storage unit 180, the action of the subject vehicle M is changed using the environment information stored in the storage unit 180 with high priority. In this way, according to the vehicle control system 100, the control plan of the subject vehicle M can be changed using information extracted by the subject vehicle M. As a result, the vehicle control system 100 can change the action of the subject vehicle M on the basis of information having a high likelihood of giving influence on the driving support of the subject vehicle M.

Second Embodiment

Figure 17:
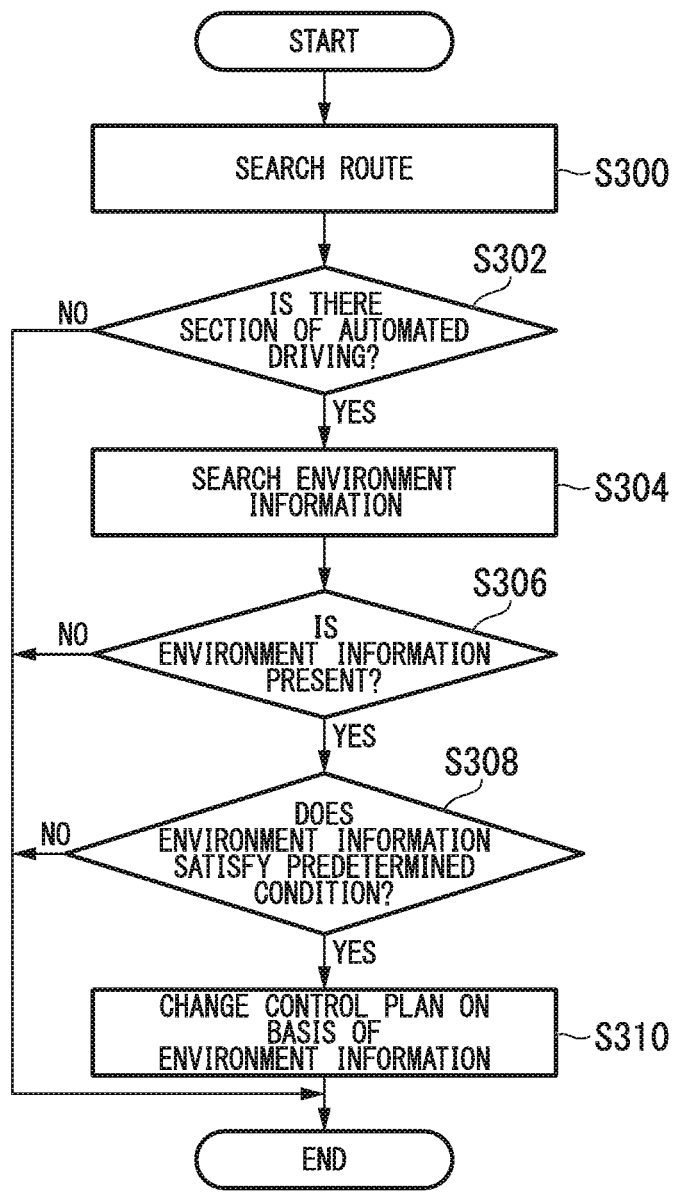
FIG. 17 is a flowchart illustrating one example of the flow of a process of a vehicle control system 100 according to a second embodiment.

Hereinafter, a vehicle control system 100 according to a second embodiment will be described. The vehicle control system 100 according to the second embodiment changes a control plan of the subject vehicle M in a case in which the environment information 188 stored in the storage unit 180 satisfies a predetermined condition, which is different from the first embodiment. FIG. 17 is a flowchart illustrating one example of the flow of a process of the vehicle control system 100 according to the second embodiment.

First, the vehicle control system 100 determines an action of the subject vehicle M on the basis of a route retrieved by the navigation device 50 (Step S300). The driving support control unit 120 generates a control plan using the control plan generating unit 144 as a control plan of the subject vehicle M. In addition, the target lane determining unit 110 determines a target lane of the subject vehicle M.

Next, the driving support control unit 120 determines whether or not a section in which the automated driving is executed has been set using the control plan generating unit 144 (Step S302). In a case in which a section in which the driving support is executed has not been set, the driving support control unit 120 ends the process.

On the other hand, in a case in which a section in which driving support is executed has been set, the driving support control unit 120 searches the environment information 188 of a place included in the section of the driving support from the environment information 188 stored in the storage unit 180 (Step S304). As a result of the search, the driving support control unit 120 determines whether or not environment information 188 of a place included in the section of the driving support is present (Step S306). In a case in which the environment information 188 of a place included in the section of the driving support is not present, the driving support control unit 120 ends the process.

On the other hand, in a case in which the environment information 188 of a place included in the section of the driving support is present, the driving support control unit 120 determines whether or not the environment information 188 satisfies a predetermined condition (Step S308). In a case in which the number of times the environment information 188 has been extracted is equal to or greater than a threshold, the driving support control unit 120 determines that the retrieved environment information 188 satisfies the predetermined condition. In addition, in a case in which an elapsed time from a time at which the environment information 188 is detected is less than a threshold, the driving support control unit 120 may determine that the retrieved environment information 188 satisfies the predetermined condition. In a case in which the retrieved environment information 188 does not satisfy the predetermined condition, the driving support control unit 120 ends the process.

Furthermore, the driving support control unit 120 may set a first threshold for an elapsed time from the detection time of the environment information 188 relating to a road on which the subject vehicle M is running to be larger than a second threshold for an elapsed time from the detection time of the environment information 188 relating to the brightness of light introduced from the outside of the subject vehicle M. More specifically, the communication control unit 190 sets the first threshold as one week and sets the second threshold as 6 hours. Accordingly, in a case in which the detection time of the environment information 188 representing that the road partition line is blurred is within one week, the driving support control unit 120 determines that received information representing that the road partition line is blurred satisfies a predetermined condition. In addition, in a case in which the detection time of the environment information 188 relating to the brightness of light is 12 hours ago, the driving support control unit 120 determines that the predetermined condition is not satisfied.

In a case in which it is determined that the retrieved environment information 188 satisfies the predetermined condition, the driving support control unit 120 changes the control plan of the subject vehicle M on the basis of the retrieved environment information 188 (Step S310). The driving support control unit 120 changes the control plan or the target lane on the basis of the retrieved environment information 188.

As described above, according to the vehicle control system 100 according to the second embodiment, the control plan of the subject vehicle M can be changed on the basis of the environment information 188 stored in the storage unit 180. In this way, according to the vehicle control system 100, driving support responding to a change in the running environment can be executed.

In addition, according to this vehicle control system 100, in a case in which the received environment information satisfies the predetermined condition, driving support is executed on the basis of the received environment information, and accordingly, driving support responding to an environment having a high likelihood of being already changed can be executed. In addition, according to the vehicle control system 100, driving support responding to an environment changing in a short period such as several hours or several days can be executed, and driving support can be executed using information having a high degree of freshness. More specifically, according to the vehicle control system 100, the first threshold for an elapsed time from the detection time of the environment information relating to a road can be set to be larger than the second threshold for an elapsed time from the detection time of the environment information relating to the brightness of light.

Third Embodiment

Hereinafter, a vehicle control system 100 according to a third embodiment will be described. The vehicle control system 100 according to the third embodiment performs inter-vehicle communication of environment information with other vehicles, which is different from the embodiments described above.

Figure 18:
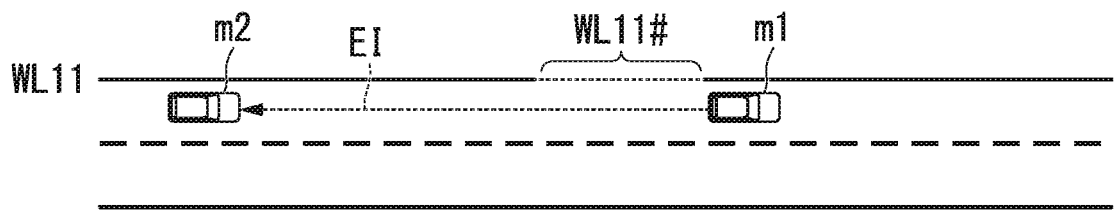
FIG. 18 is a diagram illustrating a view in which environment information EI is transmitted from a preceding vehicle m1 to a following vehicle m2.
Figure 19:
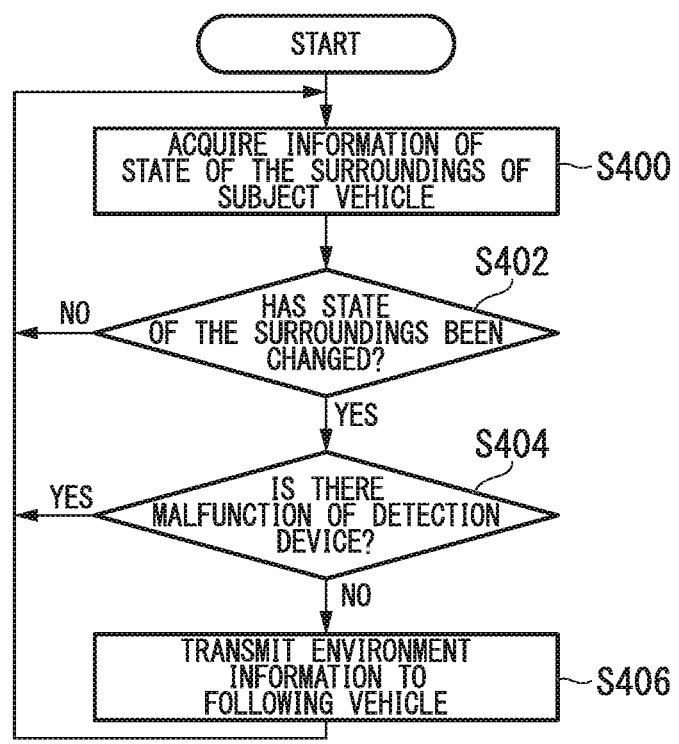
FIG. 19 is a flowchart illustrating one example of the flow of a process of a vehicle control system 100 of a preceding vehicle m1.
Figure 20:
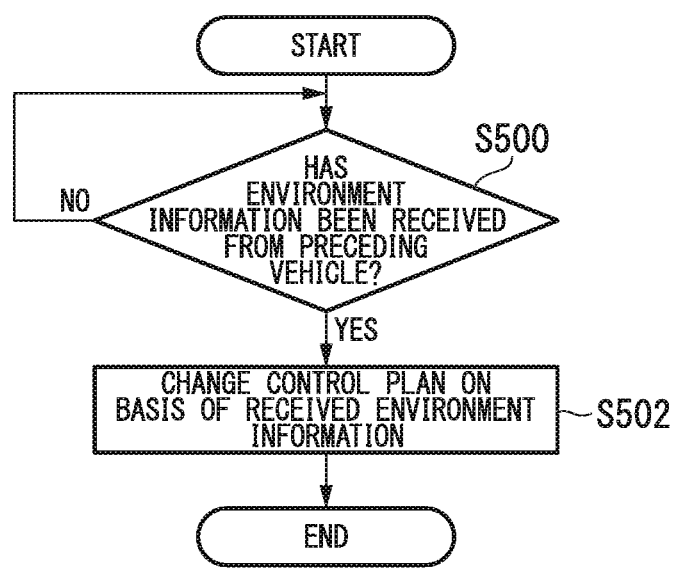
FIG. 20 is a flowchart illustrating one example of the flow of a process of a vehicle control system 100 of a following vehicle m2.

FIG. 18 is a diagram illustrating a view in which environment information EI is transmitted from a preceding vehicle m1 to a following vehicle m2 in the third embodiment. FIG. 19 is a flowchart illustrating one example of the flow of a process of the preceding vehicle m1 in the vehicle control system 100. FIG. 20 is a flowchart illustrating one example of the flow of a process of a following vehicle m2 in the vehicle control system 100.

In each of the preceding vehicle m1 and the following vehicle m2, the vehicle control system 100 according to the first embodiment is mounted. In the third embodiment, although the vehicle control system 100 may execute the process illustrated in FIG. 19 and the process illustrated in FIG. 20 in parallel with each other, the process is not limited thereto. Thus, the vehicle control system 100 may execute any one of the process illustrated in FIG. 19 and the process illustrated in FIG. 20.

The extraction unit 135 of the preceding vehicle m1 acquires information of the state of the surroundings of the preceding vehicle m1 recognized by the subject vehicle position recognizing unit 140 and the external system recognizing unit 142 (Step S400). The extraction unit 135 determines whether or not the acquired state of the surroundings of the state of the surroundings of the preceding vehicle m1 has been changed (Step S402). For example, as illustrated in FIG. 18, in a case in which a part (WL11 #) of a section of a left white line WL11 is lost, the extraction unit 135 determines that the state of the surroundings of the preceding vehicle m1 has been changed. In a case in which the state of the surroundings of the preceding vehicle m1 has not been changed, the extraction unit 135 returns the process to Step S400.

In a case in which the state of the surroundings of the preceding vehicle m1 has been changed, the extraction unit 135 determines whether or not there is a malfunction of the detection device DD using the subject vehicle position recognizing unit 140 and the external system recognizing unit 142 (Step S404). The extraction unit 135 determines whether or not there is a malfunction of the detection device DD that has detected a signal that is a source for the recognition of the changed state of the surroundings of the preceding vehicle m1. For example, in a case in which the state of a road partition line has been changed, the extraction unit 135 determines whether or not there is a malfunction of the camera 40.

In a case in which there is a malfunction of the detection device DD, the extraction unit 135 returns the process to Step S400. In other words, the change in the state of the surroundings of the preceding vehicle m1 is not on the basis of a change in the environment, and accordingly, the extraction unit 135 does not transmit the environment information. On the other hand, in a case in which there is no malfunction of the detection device DD, the extraction unit 135 transmits the environment information to the following vehicle m2 using the communication device 55 (Step S406).

Meanwhile, the vehicle control system 100 of the following vehicle m2, as illustrated in FIG. 20, determines whether or not environment information has been received from the preceding vehicle m1 (Step S500). In a case in which the environment information is received from the preceding vehicle m1, the vehicle control system 100 of the following vehicle m2 changes the control plan of the subject vehicle M on the basis of the received environment information (Step S502).

As described above, according to the vehicle control system 100 of the third embodiment, the control plan of the following vehicle m2 can be changed on the basis of the environment information received from the preceding vehicle m1. In this way, according to the third embodiment, driving support responding to a change in the running environment can be executed.

As above, while the embodiments of the present invention have been described using the embodiments, the present invention is not limited to such embodiments at all, and various modifications and substitutions may be made in a range not departing from the concept of the present invention.

REFERENCE SIGNS LIST

20 Finder
30 Radar
40 Camera
50 Navigation device
55 Communication device
100 Vehicle control system
110 Target lane determining unit
120 Driving support control unit
130 Driving support mode control unit
135 Extraction unit
140 Subject vehicle position recognizing unit
142 External system recognizing unit
144 Control plan generating unit
150 Switching control unit
160 Running control unit
180 Storage unit
182 High-accuracy map information
184 Target lane information
186 Control plan information
188 Environment information
190 Communication control unit
300 Server apparatus
310 Server control unit
320 Server communication unit
330 Server storage unit
332 Environment information

What is claimed is:

1. A vehicle control system comprising:
a processor that executes instructions to perform operations, comprising:
communicating with an external device;
detecting a state of a surrounding associated with a subject vehicle;
executing driving support by automatically executing at least a part of a speed control or a steering control of the subject vehicle based on the state associated with the surrounding of the subject vehicle;
extracting environment information that is causing a change in continuation of control in the driving support based on information of the state of the surrounding associated with the subject vehicle; and
transmitting the environment information to an external device,
wherein the operations further comprise: executing the driving support based on the environment information and an elapsed time as measured from a detection time of the environment information being less than a threshold value, and executing the driving support based on information on the surrounding of the subject vehicle without using the environment information and the elapsed time as measured from the detection time of the environment information being equal to or greater than the threshold value.

2. The vehicle control system according to claim 1, wherein the operations further comprise: requesting the environment information relating to a road on which the subject vehicle is running from the external device, and changing a control plan of the driving support in response to receiving the environment information relating to the road on which the subject vehicle is running.

3. The vehicle control system according to claim 2, wherein the environment information is first environment information, and wherein the external device receives second environment information from a plurality of vehicles;

wherein the operations further comprise: receiving the second environment information and a number of times the second environment information has been updated from the external device, and executing, based on the number of times the second environment information has been updated being equal to or greater than a threshold value, the driving support based on the second environment information, and executing, based on the number of times the second environment information has been updated being less than the threshold value, the driving support based on information on the surrounding of the subject vehicle without using the second environment information.

4. The vehicle control system according to claim 1, wherein the operations further comprise: detecting a malfunction associated with detecting the state of the surrounding associated with the subject vehicle, and excluding, in response to detecting the malfunction, information representing a malfunction representative of the environment information.

5. The vehicle control system according to claim 1, wherein the operations further comprise: counting a number of times the environment information has been extracted, and executing, based on the number of times that the environment information has been counted being equal to or greater than a threshold value, the driving support based on the environment information, and executing, based on the number of times that the environment information has been counted being less than the threshold value, the driving support based on the information on the surrounding of the subject vehicle without using the environment information.

6. The vehicle control system according to claim 1, wherein the external device is mounted in another vehicle, and wherein the operations further comprise transmitting the environment information to a following vehicle running behind the subject vehicle.

7. The vehicle control system according to claim 1, wherein the operations further comprise: receiving the environment information from a preceding vehicle running ahead of the subject vehicle, and executing the driving support based on the environment information received from the preceding vehicle.

8. The vehicle control system according to claim 1, wherein the operations further comprise: capturing an image of a road in a vicinity of the subject vehicle, executing the driving support based on a presence of a road partition line, or an absence of the road partition line, based on the image, and determining a state of the road partition line based on the image and extracting the state of the road partition line as the environment information.

9. The vehicle control system according to claim 1, wherein the operations further comprise: detecting a brightness of light introduced from outside of the subject vehicle, executing the driving support based on the brightness of the light, and extracting information of the brightness of the light as the environment information.

10. The vehicle control system according to claim 1, wherein the operations further comprise setting a first threshold value for an elapsed time as measured from a detection time of the environment information relating to a road on which the subject vehicle is running to be larger than a second threshold value for an elapsed time as measured from the detection time of the environment information relating to a brightness of a light introduced from outside of the subject vehicle.

11. A vehicle control system comprising:
a processor that executes instructions to perform operations, comprising:
communicating with an external device;
detecting a state of a surrounding associated with a subject vehicle;
executing driving support by executing at least a part of a speed control or a steering control of the subject vehicle based on the state of the surrounding associated with the subject vehicle;
extracting environment information that is causing a change in continuation of control in the driving support based on information of the state of the surrounding associated with the subject vehicle;
transmitting the environment information to an external device;
wherein the operations further comprise: requesting the environment information relating to a road on which the subject vehicle is running from the external device, and changing a control plan of the driving support based on the environment information that is received in response to the requesting of the environment information, receiving the environment information and a detection time of the environment information from the external device, and executing, based on an elapsed time as measured from the detection time of the environment information being received being less than a threshold value, the driving support based on the environment information, and executing, based on the elapsed time as measured from the detection time of the environment information being received being equal to or greater than the threshold value, the driving support based on information on the surrounding associated with the subject vehicle without using the environment information.

12. The vehicle control system according to claim 11, wherein the operations further comprise: detecting a malfunction associated with detecting the state of the surrounding associated with the subject vehicle, and excluding information based on the malfunction being detected in the environment information.

13. The vehicle control system according to claim 11,
wherein the operations further comprise: counting a number of times the environment information has been extracted, and
executing the driving support based on the environment information based on the number of times the environment information has been extracted being equal to or greater than a threshold value, and executing the driving support based on information on a surrounding of the subject vehicle without using the environment information based on the number of times the environment information has been extracted being less than the threshold value.

14. The vehicle control system according to claim 11,
wherein the external device is mounted in another vehicle, and
wherein the operations further comprise transmitting the environment information to a following vehicle running behind the subject vehicle.

15. The vehicle control system according to claim 11,
wherein the operations further comprise: receiving the environment information from a preceding vehicle running ahead of the subject vehicle, and
executing the driving support based on the environment information received from the preceding vehicle.

16. The vehicle control system according to claim 11,
wherein the operations further comprise: capturing an image of a road in a vicinity of the subject vehicle,
executing the driving support based on a presence or absence of a road partition line based on the image, and
determining a state of the road partition line based on the image and extracting the state of the road partition line as the environment information.

17. The vehicle control system according to claim 11,
wherein the operations further comprise: detecting a brightness of light introduced from outside of the subject vehicle,
executing the driving support based on the brightness of the light, and
extracting information of the brightness of the light as the environment information.

18. The vehicle control system according to claim 11,
wherein the operations further comprise setting a first threshold value for an elapsed time as measured from a detection time of the environment information relating to a road on which the subject vehicle is running to be larger than a second threshold value for an elapsed time as measured from the detection time of the environment information relating to the brightness of the light introduced from outside of the subject vehicle.

19. A vehicle control method using an in-vehicle computer comprising a processor, the vehicle control method comprising:
executing, by the in-vehicle computer, driving support for automatically executing at least a part of a speed control or a steering control of a subject vehicle based on a state associated with a surrounding of the subject vehicle;
extracting, by the in-vehicle computer, environment information that is causing a change in continuation of control in the driving support based on information of the state associated with the surrounding of the subject vehicle;
transmitting, by the in-vehicle computer, the extracted environment information to an external device; and
executing, by the in-vehicle computer, the driving support based on the environment information and an elapsed time as measured from a detection time of the environment information being less than a threshold value and executing, by the in-vehicle computer, the driving support based on information on the surrounding of the subject vehicle without using the environment information and the elapsed time as measured from the detection time of the environment information being equal to or greater than the threshold value.

20. A non-transitory machine readable medium comprising a program causing an in-vehicle computer to execute:
performing driving support for automatically executing at least a part of a speed control or a steering control of a subject vehicle based on a state of a surrounding associated with the subject vehicle;
extracting environment information that is causing a change in continuation of control in the driving support based on information of the state of the surrounding associated with the subject vehicle; and
transmitting the extracted environment information to an external device, and
executing the driving support based on the environment information and an elapsed time as measured from a detection time of the environment information being less than a threshold value and executing the driving support based on information on the surrounding of the vehicle without using the environment information is a case in which the elapsed time as measured from the detection time of the environment information is equal to or greater than the threshold value.

21. A vehicle control system comprising:
a processor that executes instructions to perform operations, comprising:
communicating with an external device;
detecting a state of a surrounding associated with a subject vehicle;
executing driving support by executing at least a part of a speed control or a steering control of the subject vehicle based on the state of the surrounding associated with the subject vehicle;
extracting environment information that is causing a change in continuation of control in the driving support based on information of the state of the surrounding associated with the subject vehicle;
transmitting the environment information to an external device,
counting a number of times the environment information has been extracted,
executing the driving support based on the environment information and the number of times the environment information has been extracted is equal to or greater than a threshold value, and executing the driving support based on information on a surrounding of the subject vehicle without using the environment information and the number of times the environment information has been extracted being less than the threshold value.

22. The vehicle control system according to claim 21,
wherein the operations further comprise: requesting the environment information relating to a road on which the subject vehicle is running from the external device, and
changing a control plan of the driving support based on the environment information that is received in response to the request.

23. The vehicle control system according to claim 22, wherein the operations further comprise: receiving the environment information and a detection time of the environment information from the external device, and executing the driving support based on the environment information and an elapsed time as measured from a detection time of the environment information being less than a threshold value, and executing the driving support based on information on a surrounding of the subject vehicle without using the environment information and the elapsed time as measured from the detection time of the environment information being equal to or greater than the threshold value.

24. The vehicle control system according to claim 21, wherein the operations further comprise: detecting a malfunction associated with detecting the state of the surrounding associated with the subject vehicle, and
excluding information based on the malfunction being detected from the environment information.

25. The vehicle control system according to claim 21, wherein the operations further comprise: executing the driving support based on the environment information and an elapsed time as measured from a detection time of the environment information being less than a threshold value, and executing the driving support based on information on the surrounding of the subject vehicle without using the environment information and the elapsed time as measured from the detection time of the environment information being equal to or greater than the threshold value.

26. The vehicle control system according to claim 21, wherein the external device is mounted in another vehicle, and
wherein the operations further comprise transmitting the environment information to a following vehicle running behind the subject vehicle.

27. The vehicle control system according to claim 21, wherein the operations further comprise: receiving the environment information from a preceding vehicle running ahead of the subject vehicle, and
executing the driving support based on the environment information received from the preceding vehicle.

28. The vehicle control system according to claim 21, wherein the operations further comprise: capturing an image of a road in a vicinity of the subject vehicle, and
executing the driving support based on a presence or absence of a road partition line based on the image, and
determining a state of the road partition line based on the image and extracting the state of the road partition line as the environment information.

29. The vehicle control system according to claim 21, wherein the operations further comprise: detecting a brightness of light introduced from outside of the subject vehicle,
executing the driving support based on the brightness of the light, and
extracting information of the brightness of the light as the environment information.

30. The vehicle control system according to claim 25, wherein the operations further comprise setting a first threshold value for an elapsed time as measured from a detection time of the environment information relating to a road on which the subject vehicle is running to be larger than a second threshold value for an elapsed time as measured from the detection time of the environment information relating to the brightness of the light introduced from outside of the subject vehicle.

31. A vehicle control system comprising:
a processor that executes instructions to perform operations, comprising:
communicating with an external device;
detecting a state of a surrounding associated with a subject vehicle;
executing driving support by executing at least a part of a speed control or a steering control of the subject vehicle based on the state of the surrounding associated with the subject vehicle;
extracting environment information that is causing a change in continuation of control in the driving support based on information of the state of the surrounding associated with the subject vehicle;
transmitting the environment information to an external device,
requesting the environment information relating to a road on which the subject vehicle is running from the external device,
changing a control plan of the driving support based on the environment information that is received in response to the request,
wherein the external device receives second environment information from a plurality of vehicles;
receiving the second environment information and a number of times the second environment information has been updated from the external device, and
executing the driving support based on the second environment information and the number of times the second environment information has been updated being equal to or greater than a threshold value, and executing the driving support based on second information on the surrounding of the subject vehicle without using the second environment information and the number of times the second environment information has been updated being less than the threshold value.

32. The vehicle control system according to claim 31, wherein the operations further comprise: detecting a malfunction associated with detecting the state of the surrounding associated with the subject vehicle, and
excluding information based on the malfunction being detected from the environment information.

33. The vehicle control system according to claim 31, wherein the operations further comprise: executing the driving support based on the environment information and an elapsed time as measured from a detection time of the environment information being less than a threshold value, and executing the driving support based on information on the surrounding of the subject vehicle without using the environment information and the elapsed time as measured from the detection time of the environment information being equal to or greater than the threshold value.

34. The vehicle control system according to claim 31, wherein the external device is mounted in another vehicle, and
wherein the operations further comprise transmitting the environment information to a following vehicle running behind the subject vehicle.

35. The vehicle control system according to claim 31, wherein the operations further comprise: receiving the environment information from a preceding vehicle running ahead of the subject vehicle, and
executing the driving support based on the environment information received from the preceding vehicle.

36. The vehicle control system according to claim 31, wherein the operations further comprise: capturing an image of a road in a vicinity of the subject vehicle, executing the driving support based on a presence or absence of a road partition line based on the image, and determining a state of the road partition line based on the image and extracting the state of the road partition line as the environment information.

37. The vehicle control system according to claim 31, wherein the operations further comprise: detecting a brightness of light introduced from outside of the subject vehicle, executing the driving support based on the brightness of the light, and extracting information of the brightness of the light as the environment information.

38. The vehicle control system according to claim 33, wherein the operations further comprise setting a first threshold value for an elapsed time as measured from a detection time of the environment information relating to a road on which the subject vehicle is running to be larger than a second threshold value for an elapsed time as measured from the detection time of the environment information relating to the brightness of the light introduced from outside of the subject vehicle.

39. A vehicle control method using an in-vehicle computer comprising a processor, the vehicle control method comprising:

executing, by the in-vehicle computer, driving support by executing at least a part of a speed control or a steering control of a subject vehicle based on a state of a surrounding associated with the subject vehicle;

extracting, by the in-vehicle computer, environment information that is causing a change in continuation of control in the driving support based on information of the state of the surrounding associated with the subject vehicle;

transmitting, by the in-vehicle computer, the extracted environment information to an external device;

counting, by the in-vehicle computer, the number of times the environment information has been extracted; and executing, by the in-vehicle computer, the driving support based on the environment information and the number of times the environment information has been extracted is equal to or greater than a threshold value, and executing the driving support based on information on a surrounding of the subject vehicle without using the environment information and the number of times the environment information has been extracted being less than the threshold value.

40. A non-transitory machine readable medium comprising a program causing an in-vehicle computer to execute:

performing driving support by executing at least a part of a speed control or a steering control of a subject vehicle based on a state of a surrounding associated with the subject vehicle;

extracting environment information that is causing a change in continuation of control in the driving support based on information of the state of the surrounding associated with the subject vehicle;

transmitting the extracted environment information to an external device;

counting a number of times the environment information has been extracted; and executing the driving support based on the environment information and the number of times the environment information has been extracted is equal to or greater than a threshold value, and executing the driving support based on information on a surrounding of the subject vehicle without using the environment information and the number of times the environment information has been extracted being less than the threshold value.

* * * * *